US011832226B2

(12) United States Patent
Raghavan et al.

(10) Patent No.: US 11,832,226 B2
(45) Date of Patent: Nov. 28, 2023

(54) INDICATING SLOT FORMAT INDICES USED ACROSS MULTIPLE USER EQUIPMENTS

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 137 days.

(21) Appl. No.: 17/177,962

(22) Filed: Feb. 17, 2021

(65) Prior Publication Data
US 2021/0307005 A1    Sep. 30, 2021

Related U.S. Application Data

(60) Provisional application No. 63/000,230, filed on Mar. 26, 2020.

(51) Int. Cl.
| | |
|---|---|
| *H04W 72/04* | (2023.01) |
| *H04W 72/0446* | (2023.01) |
| *H04W 16/28* | (2009.01) |
| *H04W 72/541* | (2023.01) |

(52) U.S. Cl.
CPC ....... *H04W 72/0446* (2013.01); *H04W 16/28* (2013.01); *H04W 72/541* (2023.01)

(58) Field of Classification Search
CPC ............. H04W 72/0446; H04W 16/28; H04W 72/082
See application file for complete search history.

(56) References Cited

U.S. PATENT DOCUMENTS

| | | | | |
|---|---|---|---|---|
| 6,377,213 | B1 * | 4/2002 | Odachi | G01S 3/48 342/383 |
| 2005/0111528 | A1 * | 5/2005 | Fulghum | H04B 1/7107 375/E1.032 |
| 2008/0112517 | A1 * | 5/2008 | Parts | H04B 15/00 375/346 |
| 2013/0294268 | A1 * | 11/2013 | Xu | H04W 72/541 370/278 |
| 2014/0192727 | A1 * | 7/2014 | Liu | H04B 7/0671 370/329 |
| 2017/0338875 | A1 * | 11/2017 | Berglund | H04B 7/0626 |

FOREIGN PATENT DOCUMENTS

WO    WO-2009023681 A2 *  2/2009 ........... H04B 7/0617

* cited by examiner

*Primary Examiner* — Brenda H Pham
(74) *Attorney, Agent, or Firm* — Holland & Hart LLP

(57) ABSTRACT

Methods, systems, and devices for wireless communications are described. A first wireless device may receive a first indication indicating a communication direction for the first wireless device for each of a plurality of time periods for a time interval. The first wireless device may also receive a second indication associated with a second wireless device indicating a communication direction for the second wireless device. The first wireless device may adjust a communication configuration for at least a set of time periods of the plurality of time periods based on identifying a communication direction mismatch between the first wireless device and the second wireless device, where the communication direction mismatch is based on the first indication and the second indication.

20 Claims, 16 Drawing Sheets

INDICATING SLOT FORMAT INDICES USED ACROSS MULTIPLE USER EQUIPMENTS

CROSS REFERENCE

The present Application for Patent claims the benefit of U.S. Provisional Patent Application No. 63/000,230 by RAGHAVAN et al., entitled "INDICATING SLOT FORMAT INDICES USED ACROSS MULTIPLE USER EQUIPMENTS," filed Mar. 26, 2020, assigned to the assignee hereof, and expressly incorporated by reference in its entirety herein.

FIELD OF TECHNOLOGY

The following relates generally to wireless communications and more specifically to indicating slot format indices used across multiple user equipments (UEs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A base station may configure a UE with resources for uplink or downlink communications. However, one or more UEs communicating in a wireless communications system may cause interference with each other or with the base station.

SUMMARY

The described techniques relate to improved methods, systems, devices, and apparatuses that support indicating slot format indices used across multiple user equipments (UEs). Generally, the described techniques provide for mitigating interference caused by a mismatched slot format indication (SFI) between one or more wireless devices (e.g., UEs). One or more wireless devices may communicate with a base station as part of a wireless communications system. A wireless device may communicate according to a first SFI, and a second wireless device may communicate according to a second SFI. In some cases, the communications according to the two SFIs may cause interference. The wireless devices may include UEs, machine-type-communication (MTC) device, repeaters, or other wireless devices.

For example, a first wireless device may receive a first indication (e.g., a first SFI) associated with the first wireless device, where the first indication indicates a communication direction for the first wireless device for each of a set of time periods for a time interval (e.g., for symbols within a slot). The first wireless device may receive a second indication (e.g., a second SFI) associated with a second wireless device, where the second indication indicates a communication direction for the second wireless device for each of the set of time periods for the time interval. The first wireless device or the second wireless device (in coordination with the base station) may adjust a communication configuration for at least a subset of the set of time periods based on a communication direction mismatch between the first wireless device and the second wireless device, where the communication direction mismatch is based on the first indication and the second indication. For example, the first wireless device may make interference measurements and may adjust its downlink reception accordingly, or the first wireless device may adapt the modulation and coding scheme (MCS) of the first wireless device based on the potential interference, or the first wireless device may request a beam switch from a serving base station, or the first wireless device may generate a beam null in the interference direction.

A method of wireless communications at a first wireless device is described. The method may include receiving a first indication associated with the first wireless device, where the first indication indicates a communication direction for the first wireless device for each of a set of time periods for a time interval, receiving a second indication associated with a second wireless device, where the second indication indicates a communication direction for the second wireless device for each of the set of time periods for the time interval, and adjusting a communication configuration for at least a subset of the set of time periods based on a communication direction mismatch, where the communication direction mismatch is based on the first indication and the second indication.

An apparatus for wireless communications at a first wireless device is described. The apparatus may include a processor, memory coupled with the processor, and instructions stored in the memory. The instructions may be executable by the processor to cause the apparatus to receive a first indication associated with the first wireless device, where the first indication indicates a communication direction for the first wireless device for each of a set of time periods for a time interval, receive a second indication associated with a second wireless device, where the second indication indicates a communication direction for the second wireless device for each of the set of time periods for the time interval, and adjust a communication configuration for at least a subset of the set of time periods based on a communication direction mismatch, where the communication direction mismatch is based on the first indication and the second indication.

Another apparatus for wireless communications at a first wireless device is described. The apparatus may include means for receiving a first indication associated with the first wireless device, where the first indication indicates a communication direction for the first wireless device for each of a set of time periods for a time interval, receiving a second indication associated with a second wireless device, where the second indication indicates a communication direction for the second wireless device for each of the set of time periods for the time interval, and adjusting a communication configuration for at least a subset of the set of time periods based on a communication direction mismatch, where the communication direction mismatch is based on the first indication and the second indication.

A non-transitory computer-readable medium storing code for wireless communications at a first wireless device is described. The code may include instructions executable by a processor to receive a first indication associated with the first wireless device, where the first indication indicates a communication direction for the first wireless device for each of a set of time periods for a time interval, receive a second indication associated with a second wireless device, where the second indication indicates a communication direction for the second wireless device for each of the set of time periods for the time interval, and adjust a communication configuration for at least a subset of the set of time periods based on a communication direction mismatch, where the communication direction mismatch is based on the first indication and the second indication.

In some examples of the method, apparatuses, and non-transitory computer-readable medium described herein, adjusting the communication configuration may include operations, features, means, or instructions for measuring interference for at least a set of time periods for one or more previous time intervals, performing an interference and noise covariance matrix estimate based on the measured interference, and adjusting a downlink channel reception parameter based on the measured interference and the interference and noise covariance matrix estimate.

In some examples of the method, apparatuses, and non-transitory computer-readable medium described herein, adjusting the communication configuration may include operations, features, means, or instructions for adapting a MCS for at least the set of time periods.

In some examples of the method, apparatuses, and non-transitory computer-readable medium described herein, adjusting the communication configuration may include operations, features, means, or instructions for transmitting a beam switch request for communications by the first UE during at least the set of time periods.

In some examples of the method, apparatuses, and non-transitory computer-readable medium described herein, adjusting the communication configuration may include operations, features, means, or instructions for generating a beam null in an interference direction of the second UE.

Some examples of the method, apparatuses, and non-transitory computer-readable medium described herein may further include operations, features, means, or instructions for receiving an indication of the interference direction from a network or the second wireless device, where generating the beam null may be based on the received indication of the interference direction.

In some examples of the method, apparatuses, and non-transitory computer-readable medium described herein, the set of time periods includes a set of symbols and the time interval includes a slot.

In some examples of the method, apparatuses, and non-transitory computer-readable medium described herein, the communication direction for the first wireless device may be based on an uplink symbol, a downlink symbol, a flexible symbol, or a gap symbol.

In some examples of the method, apparatuses, and non-transitory computer-readable medium described herein, the communication direction for the second wireless device may be based on an uplink symbol, a downlink symbol, a flexible symbol, or a gap symbol.

In some examples of the method, apparatuses, and non-transitory computer-readable medium described herein, the communication direction mismatch is based on an uplink direction indicated by the first indication for the set of time periods and a downlink direction indicated by the second indication for the set of time periods.

A method of wireless communications at a base station is described. The method may include transmitting a first indication associated with a first wireless device, where the first indication indicates a communication direction for the first wireless device for each of a set of time periods for a time interval, identifying a communication direction mismatch between the first indication and a second indication for a second wireless device for at least a subset of the set of time periods, and transmitting the second indication to the first wireless device based on the communication direction mismatch.

An apparatus for wireless communications at a base station is described. The apparatus may include a processor, memory coupled with the processor, and instructions stored in the memory. The instructions may be executable by the processor to cause the apparatus to transmit a first indication associated with a first wireless device, where the first indication indicates a communication direction for the first wireless device for each of a set of time periods for a time interval, identify a communication direction mismatch between the first indication and a second indication for a second wireless device for at least a subset of the set of time periods, and transmit the second indication to the first wireless device based on the communication direction mismatch.

Another apparatus for wireless communications at a base station is described. The apparatus may include means for transmitting a first indication associated with a first wireless device, where the first indication indicates a communication direction for the first wireless device for each of a set of time periods for a time interval, identifying a communication direction mismatch between the first indication and a second indication for a second wireless device for at least a subset of the set of time periods, and transmitting the second indication to the first wireless device based on the communication direction mismatch.

A non-transitory computer-readable medium storing code for wireless communications at a base station is described. The code may include instructions executable by a processor to transmit a first indication associated with a first wireless device, where the first indication indicates a communication direction for the first wireless device for each of a set of time periods for a time interval, identify a communication direction mismatch between the first indication and a second indication for a second wireless device for at least a subset of the set of time periods, and transmit the second indication to the first wireless device based on the communication direction mismatch.

Some examples of the method, apparatuses, and non-transitory computer-readable medium described herein may further include operations, features, means, or instructions for determining an interference direction between the first wireless device and the second wireless device, and transmitting an indication of the determined interference direction to the first wireless device.

Some examples of the method, apparatuses, and non-transitory computer-readable medium described herein may further include operations, features, means, or instructions for receiving a beam switch request from the first wireless device for at least the set of time periods.

In some examples of the method, apparatuses, and non-transitory computer-readable medium described herein, the communication direction for the first wireless device may be based on an uplink symbol, a downlink symbol, a flexible symbol, or a gap symbol.

In some examples of the method, apparatuses, and non-transitory computer-readable medium described herein, the communication direction mismatch is based on an uplink direction indicated by the first indication for the set of time periods and a downlink direction indicated by the second indication for the set of time periods.

Some examples of the method, apparatuses, and non-transitory computer-readable medium described herein may further include operations, features, means, or instructions for communicating with the first wireless device via a first transmission and reception point (TRP), and communicating with the second wireless device via a second TRP.

In some examples of the method, apparatuses, and non-transitory computer-readable medium described herein, the transmitting the second indication to the first wireless device may be based on communicating with the first wireless device via the first TRP and communicating with the second wireless device via the second TRP.

In some examples of the method, apparatuses, and non-transitory computer-readable medium described herein, the transmitting the second indication to the first wireless device may further include adjusting an index of the second indication based on the communication direction mismatch.

DETAILED DESCRIPTION

One or more user equipments (UEs) may communicate with a base station as part of a wireless communications system. A UE may communicate according to a first slot format indication (SFI), and a second UE may communicate according to a second SFI. ASFI may indicate to a UE a communication direction on a per symbol basis. Each symbol may indicate an uplink communication direction, a downlink communication direction, a flexible communication direction (e.g., communication direction configurable by a base station), or gap symbol (e.g., a communication direction configurable by the UE) for each time period within a larger time interval (e.g., for each symbol within a slot). The UE may communicate in each slot as indicated in the SFI.

In some cases, the communications by a first UE according to the first SFI and the communications by a second UE according to the second SFI may cause interference (e.g., interference at one of the UEs or at the base station). One or both UEs may experience interference in the symbols having the communication direction mismatch. For example, a first UE may be configured to communicate uplink transmissions in a symbol, and a second UE may be configured to communicate downlink transmissions in the same symbol. Depending on the communication directions chosen by each UE for that symbol (e.g., a beam direction), the uplink transmissions by the first UE may cause interference to downlink transmission reception by the second UE. In many cases, a UE may not be aware of the SFI of other UEs, and thus interference may be difficult to avoid. This potential interference may further increase as the number of UEs in a cell increases. For example, increased interference may cause further communication interruptions in a small cell scenario, such as a small cell communicating using millimeter wave carrier frequencies.

In order to avoid or reduce cross-link interference (CLI) between UEs caused by SFI mismatch, the network may send to a first UE the SFI for the first UE and an SFI for a second UE (of a number of UEs in the cell). Thus the first UE may autonomously make adjustments to its communication behavior to potentially mitigate interference caused by a communication direction mismatch between the first and second SFI. For example, the first UE may measure interference and adjust its downlink reception accordingly, adapt its modulation and coding scheme (MCS) based on the potential interference, request a beam switch, or generate a beam null in the direction of the identified interference.

Aspects of the disclosure are initially described in the context of wireless communications systems. Aspects of the disclosure are then described with respect to process flows. Aspects of the disclosure are further illustrated by and described with reference to apparatus diagrams, system diagrams, and flowcharts that relate to indicating slot format indices used across multiple UEs.

Figure 1:
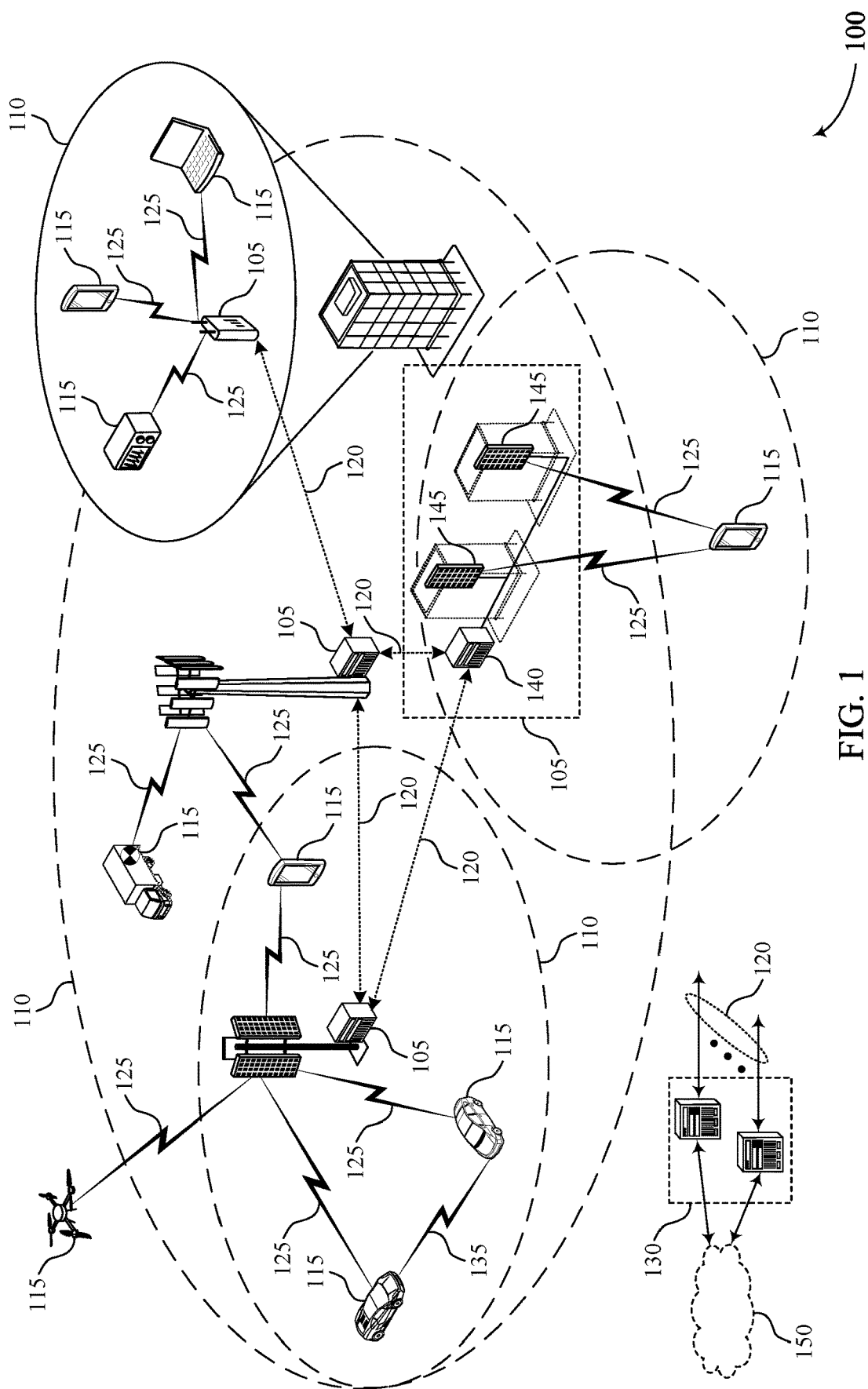
FIG. 1 illustrates an example of a system for wireless communications that supports indicating slot format indices used across multiple user equipments (UEs) in accordance with aspects of the present disclosure.

FIG. 1 illustrates an example of a wireless communications system 100 that supports indicating slot format indices used across multiple UEs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may communicate according to a first SFI, and a second UE 115 may communicate according to a second SFI. In some cases, the communications according to the two SFIs may cause interference (e.g., due to a communication direction mismatch for one or more symbols indicated by the two SFIs). However, wireless communications system 100 may support a base station 105 sending a first SFI associated with a first UE 115 to the first UE 115, and sending a second SFI associated with a second UE 115 to the first UE 115.

For example, a first UE 115 may receive a first indication associated with the first UE 115, where the first indication may indicate a communication direction for the first UE 115 for each of a set of time periods for a time interval. The first UE 115 may receive a second indication associated with a second UE 115, where the second indication may indicate a communication direction for the second UE 115 for each of the set of time periods for the time interval. The first UE 115 may adjust a communication configuration for at least a subset of the set of time periods based on identifying a communication direction mismatch between the first UE 115 and the second UE 115, where the communication direction mismatch is based on the first indication and the second indication. For example, the first UE 115 may make interference measurements and may adjust its downlink reception accordingly, or the UE 115 may adapt the MCS of the UE 115 based on the potential interference, or the UE 115 may request a beam switch from a serving base station 105, or the UE 115 may generate a beam null in the interference direction.

Figure 2:
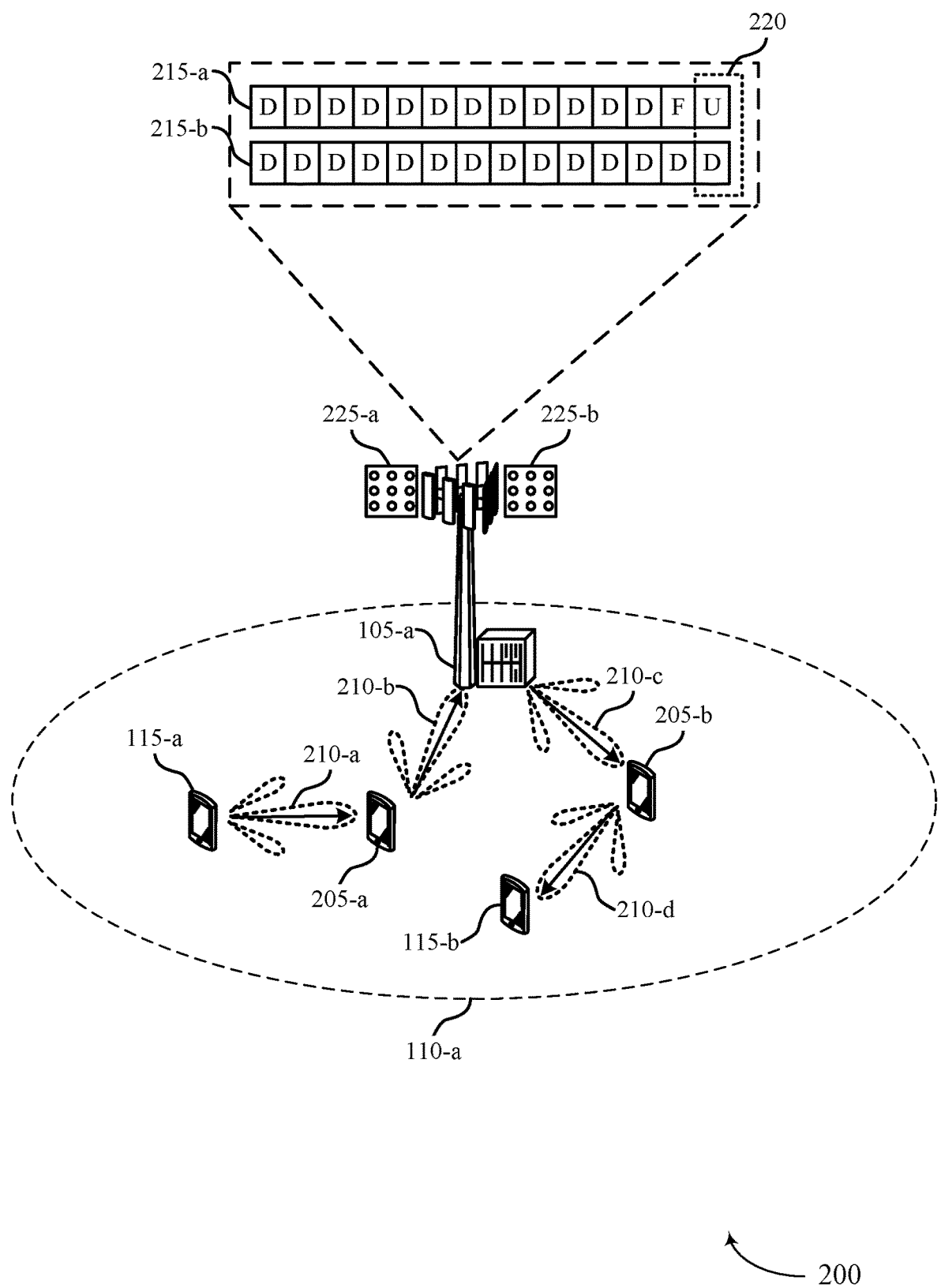
FIG. 2 illustrates an example of a wireless communications system that supports indicating slot format indices used across multiple UEs in accordance with aspects of the present disclosure.

FIG. 2 illustrates an example of a wireless communications system 200 that supports indicating slot format indices used across multiple UEs in accordance with aspects of the present disclosure. In some examples, wireless communications system 200 may implement aspects of wireless communication system 100. Wireless communications system 200 may include UE 115-a and UE 115-b which may be examples of UEs 115 as described with respect to FIG. 1. Wireless communications system 200 may include base station 105-a, which may be an example of a base station 105 as described with respect to FIG. 1. Base station 105-a may include TRPs 225-a and 225-b. In some cases, base station 105-a may communicate with UE 115-a via TRP 225-a, and may communicate with UE 115-b via second TRP 225-b.

UE 115-a may communicate with base station 105-a according to SFI 215-a. SFI 215-a may be an example of an indication or message that indicates a communication direction for the UE 115-a for a plurality of time periods of a time interval (e.g., for a plurality of OFDM symbols within a slot). For example, SFI 215-a may indicate a downlink communication direction for the first 12 symbols of a slot, a flexible communication direction for the 13th symbol, and an uplink communication direction for the 14th symbol. UE 115-b may communicate with base station 105-a according to SFI 215-b. SFI 215-b may similarly be an example of an indication or message that indicates a communication direction for each of a plurality of time periods for a time interval for UE 115-b. For example, SFI 215-b may indicate a downlink communication direction for all 14 symbols of a slot. SFI 215-a and SFI 215-b may be associated with preconfigured index numbers, and base station 105-b may indicate a particular SFI 215 to a UE 115 via an SFI index number.

UE 115-a and UE 115-b may be configured to communicate with base station 105-a according to SFIs 215, which may be allocated to UEs 115 via control signaling by base station 105-a. In some cases, different SFIs 215 are allocated to different UEs 115 within a coverage area 110-a. In some cases, a UE 115 (e.g., UE 115-a) may receive an indication of SFI 215-a for that UE 115-a, but may not receive an indication of the SFI 215 for another UE 115 (e.g., SFI 215-b for UE 115-b). For example, a communication system may be limited to sending SFIs 215 to a UE 115 that indicate communication directions for that UE 115 (e.g., due to design simplicity, security, and/or privacy constraints).

Base station 105-a and UEs 115 may communicate using beamformed or direction communications (e.g., beams 210). During symbol 220, UE 115-a may be configured to communicate over uplink to base station 105-a according to SFI 215-a. During symbol 220, UE 115-b may be configured to receive downlink communications from base station 105-a according to SFI 215-b. In some cases, UE 115 may communicate with base station 105-a via other wireless devices 205-a.

For example, in symbol 220, UE 115-a may transmit uplink messages to base station 105-a using beams 210-a. UE 115-a may transmit messages using beams 210-a to wireless device 205-a, which may then be relayed to base station 105-a using beams 210-b. Base station 105-a may also communicate with UE 115-b via wireless device 205-b. For example, in symbol 220, base station 105-a may transmit downlink transmissions to UE 115-b by transmitting using beams 210-c, and wireless device 205-b may relay the messages using beams 210-d. In other configurations, base station 105-a may communicate with UEs 115-a and 115-b directly, rather than via wireless devices 205.

In some cases, based on the location and direction of transmissions to and from UE 115-a and UE 115-b, interference between downlink transmissions and uplink transmissions may occur. For example, in symbol 220, uplink transmissions by UE 115-a may cause cross-link interference (CLI) with downlink transmissions to UE 115-b. The CLI may be based on the configurations of SFIs 215.

Wireless communications system 200 may support adaptive signaling sent to a first UE 115 that indicates the SFI 215 of other UEs 115, which may improve reliability and decrease CLI, particularly in cases where the UE 115 may take action to mitigate or decrease the potential CLI. For example, base station 105-a may indicate SFI 215-b to UE 115-b (e.g., the SFI that UE 115-b will communicate according to) and base station 105-a may also indicate SFI 215-a to UE 115-b (e.g., the SFI of UE 115-a).

Based on receiving an indication of SFI 215-b and an indication of SFI 215-a, UE 115-b may determine that a communication direction mismatch may occur. In the example of SFIs 215-a and 215-b, the communication direction mismatch is determined based on the mismatch in communication directions in symbol 220. However, in cases of other SFI configurations, there may be other symbols or multiple symbols within a time period on which a communication direction mismatch may be identified.

Based on determining that the communication direction mismatch occurs, which may cause CLI, UE 115-b may adapt different communications parameters in order to mitigate the interference. In a first example, UE 115-b may perform an interference and noise covariance matrix estimate (e.g., a $R_{nn}$ matrix estimate) for the symbol 220 in one or more previous slots. The matrix estimate of $R_{nn}$ may capture the subspace or directions over which interference from other simultaneous uplink transmissions may be detected at UE 115-b. UE 115-b may then use the $R_{nn}$ interference estimate to adjust a reception parameter of the downlink channel (e.g., adjust a non-codebook based physical downlink shared channel (PDSCH) parameter).

In another example, UE 115-b may adapt or change the MCS for a set of symbols that UE 115-b is configured to use (e.g., based on an expected lower signal-to-interference and noise ratio (SINR) for a particular set of symbols). For example, UE 115-b may use a lower MCS to mitigate the potential CLI in symbol 220. UE 115-b may convey the lower MCS to base station 105-a via feedback communications, such as a channel quality indication (CQI), a rank indicator (RI), or a precoding matrix indicator (PMI) change.

In another example, UE 115-b may request a beam switch for one or more symbols based on receiving the two SFIs 215. UE 115-b may transmit, to base station 105-a a beam switch request, so that UE 115-b can receive downlink communications from base station 105-a in symbol 220 in a direction that may not receive interfering communication from uplink transmissions by UE 115-a to base station 105-b. In some cases, UE 115-b may receive an indication of an estimated interference direction from the network (e.g., via base station 105-a) or from UE 115-a (e.g., based on UE 115-a receiving an indication of SFI 215-a and 215-b). Based on the indication of the direction of the potential interference, UE 115-b may transmit the beam switch request. In some cases, UE 115-b may include a request for a particular beam direction in the beam switch request.

In another case, UE 115-b may generate a beam null in the direction of the interference from UE 115-a. UE 115-b may generate the beam null based on receiving the indication of the interference direction from the network or from UE 115-a. By using the beam null, UE 115-b may decrease reception of interference from uplink transmissions by UE 115-a during symbol 220.

Figure 3:
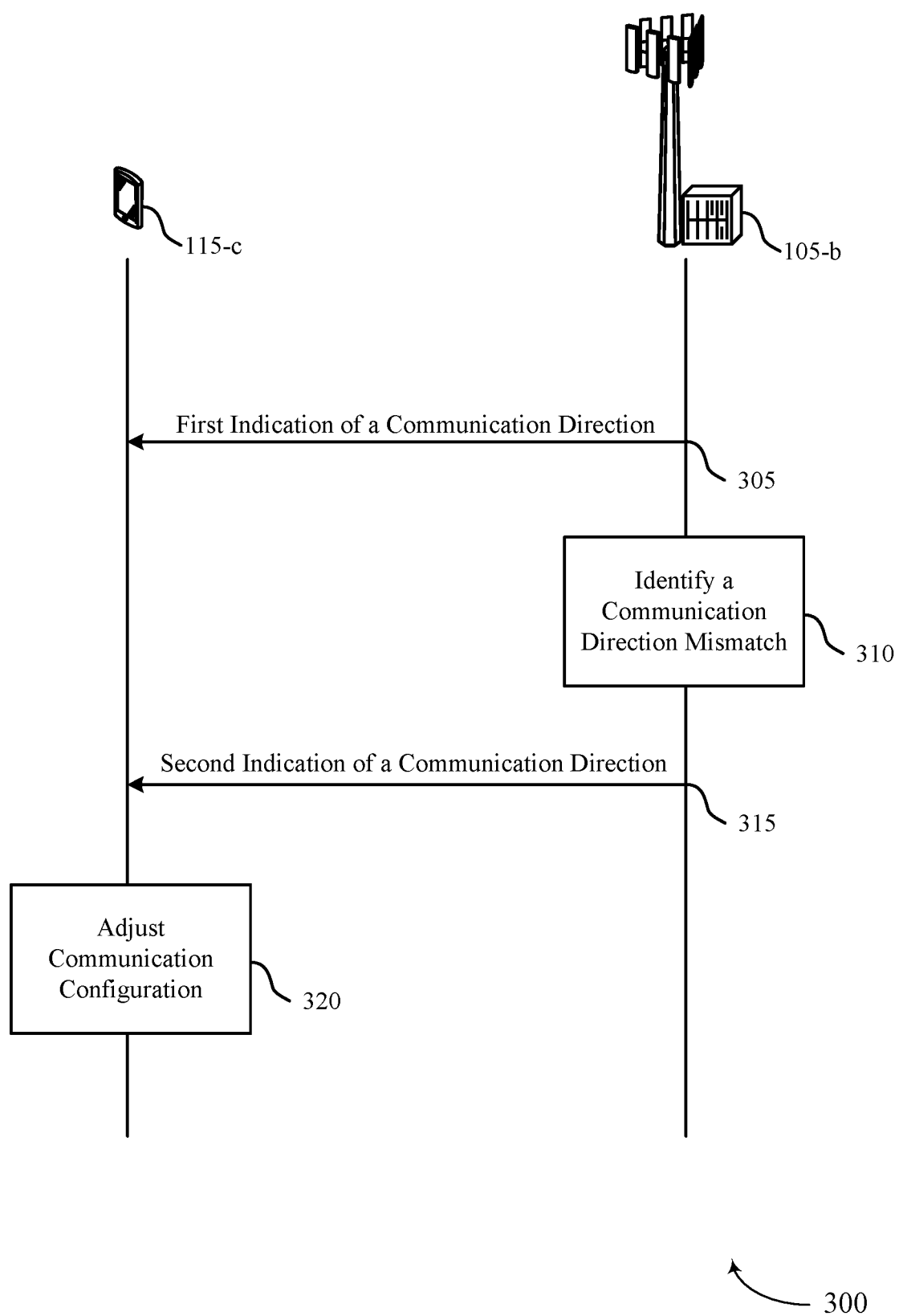
FIG. 3 illustrates an example of a process flow that supports indicating slot format indices used across multiple UEs in accordance with aspects of the present disclosure.

FIG. 3 illustrates an example of a process flow 300 that supports indicating slot format indices used across multiple UEs in accordance with aspects of the present disclosure. In some examples, process flow 300 may implement aspects of wireless communication systems 100 and 200. Process flow 300 may include UE 115-c and base station 105-b, which may be examples of UEs 115 and base stations 105 as described with respect to FIGS. 1 and 2.

At 305, base station 105-b may transmit, and UE 115-c may receive, a first indication (e.g., a first SFI) associated with UE 115-c. The first indication may indicate a communication direction for UE 115-c for each of a plurality of time periods for a time interval. The plurality of time periods may include a plurality of symbols, and the time interval may include a slot. The communication direction for UE 115-c may include an uplink direction, a downlink direction, or a flexible communication direction.

At 310, base station 105-*b* may identify a communication direction mismatch between the first indication and a second indication for a second UE 115 for at least a set of time periods of the plurality of time periods. In some cases, base station 105-*b* may communicate with UE 115-*c* via a first TRP and may communicate with a second UE 115 via a second TRP.

At 315, base station 105-*b* may transmit, and UE 115-*c* may receive, a second indication (e.g., a second SFI) associated with a second UE 115 (not shown). The second indication may indicate a communication direction for the second UE 115 for each of the plurality of time periods for the time interval (e.g., for the symbols of the same slot as the first SFI). The communication direction for the second UE 115 may be indicated by the type of symbol as defined in the SFI. The type of symbol may indicate an uplink direction, a downlink direction, a flexible symbol (e.g., a symbol in which the communication direction for the symbol may be configurable by a base station), or a gap symbol (e.g., a symbol in which the communication direction for the symbol may be appropriately assigned by the UE). The base station 105-*b* or the UE 115-*c* may identify a communication direction mismatch between the UE 115-*c* and the second UE 115 based on the first indication and the second indication. More specifically, the communication direction mismatch may be based on an uplink direction indicated by the first indication for the set of time periods and a downlink direction indicated by the second indication for the set of time periods. The transmission of the second indication at 315 may be in response to the base station 105-*b* identifying the communication direction mismatch at 310. As such, the base station 105-*b* may select one or more UEs 115 for sending the SFIs of other UEs (e.g., based on potential identified interference). In other cases, the base station 105-*b* may send the second SFI to the UE 115-*c* based on a configuration, and the UE 115-*c* may identify the communication direction mismatch between the first and second SFI.

At 320, UE 115-*c* may adjust a communication configuration for at least a subset of the set of time periods, based on the communication direction mismatch identified by the base station 105-*b* or the UE 115-*c*. In some cases, UE 115-*c* may measure interference for at least a set of time periods for one or more previous time intervals, and UE 115-*c* may adjust a downlink channel reception parameter based on the measured interference. In another case, UE 115-*c* may adapt an MCS for the at least the subset of the set of time periods. In another case, UE 115-*c* may transmit a beam switch request for communications by UE 115-*c* during at least the subset of the set of time periods.

In another case, UE 115-*c* may generate a beam null in an interference direction. Base station 105-*b* may determine an interference direction between UE 115-*c* and the second UE 115. Base station 105-*b* may transmit an indication of the determined interference direction to UE 115-*c*. UE 115-*c* may receive an indication of the interference direction from a network (e.g., via base station 105-*b*) or another UE 115. UE 115-*c* may generate the beam null based on the received indication of the interference direction.

Figure 4:
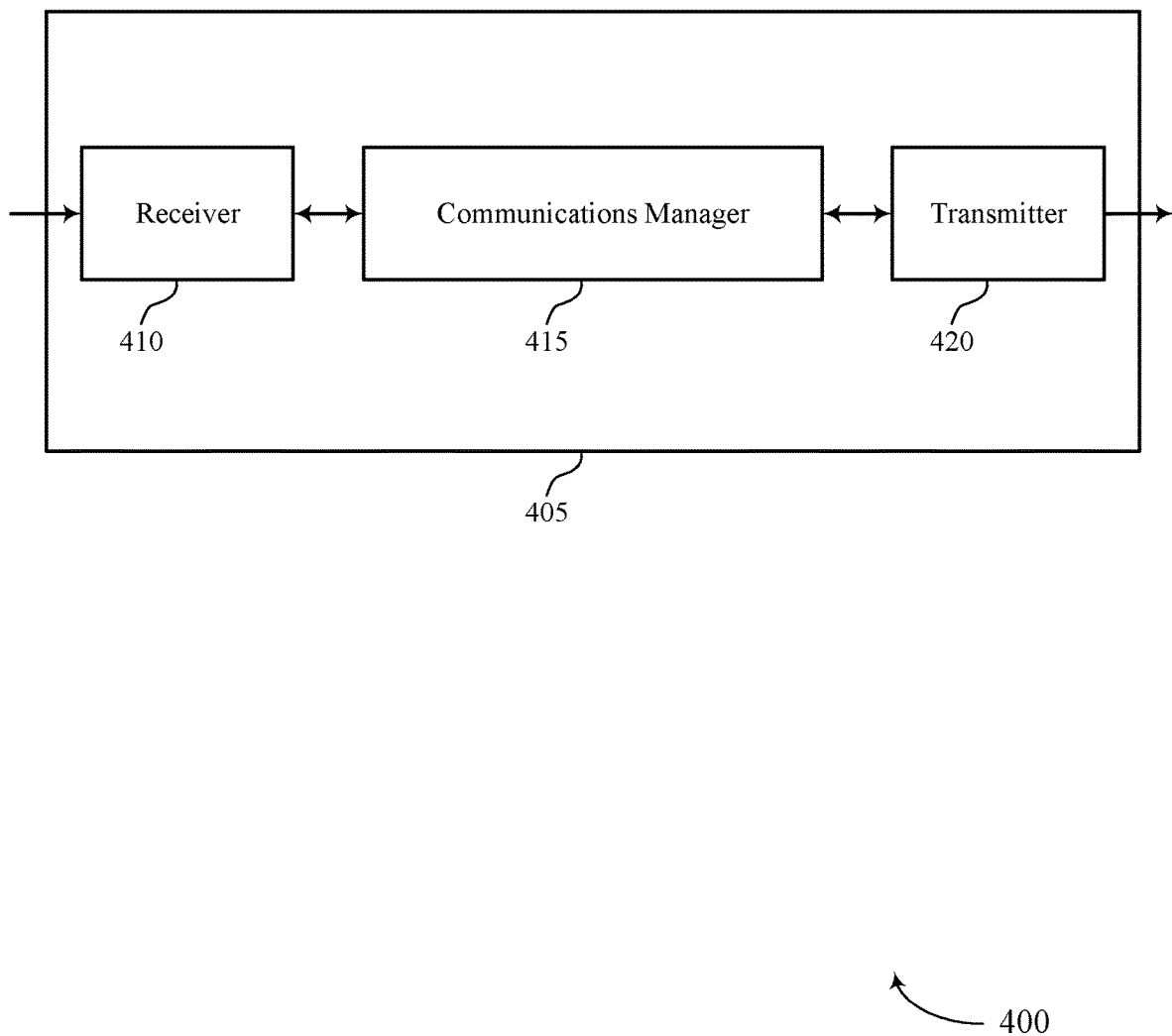
FIGS. 4 and 5 show block diagrams of devices that support indicating slot format indices used across multiple UEs in accordance with aspects of the present disclosure.

FIG. 4 shows a block diagram 400 of a device 405 that supports indicating slot format indices used across multiple UEs in accordance with aspects of the present disclosure. The device 405 may be an example of aspects of a UE 115 as described herein. The device 405 may include a receiver 410, a communications manager 415, and a transmitter 420.

The device 405 may also include a processor. Each of these components may be in communication with one another (e.g., via one or more buses).

The receiver 410 may receive information such as packets, user data, or control information associated with various information channels (e.g., control channels, data channels, and information related to indicating slot format indices used across multiple UEs, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive a first indication associated with a first wireless device, where the first indication indicates a communication direction for the first wireless device for each of a set of time periods for a time interval, receive a second indication associated with a second wireless device, where the second indication indicates a communication direction for the second wireless device for each of the set of time periods for the time interval, and adjust a communication configuration for at least a subset of the set of time periods based on a communication direction mismatch, where the communication direction mismatch is based on the first indication and the second indication. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

In some examples, the communications manager 415 described herein may be implemented as a chipset of a wireless modem, and the receiver 410 and the transmitter 420 may be implemented as sets of analog components (e.g., amplifiers, filters, phase shifters, antennas, etc.) The wireless modem may obtain and decode signals from the receiver 410 over a receive interface, and may output signals for transmission to the transmitter 420 over a transmit interface.

The actions performed by the communications manager 415 as described herein may be implemented to realize one or more potential advantages. One implementation may allow the device 405 (e.g., a UE 115) to save power and increase battery life by mitigating interference in downlink and uplink transmissions to and from the device 405. The communications manager 415 may effectively organize communications to and from the device 405 to mitigate CLI, which may therefore decrease the number of retransmissions to and from the device 405, which may save power and increase battery life.

Figure 5:
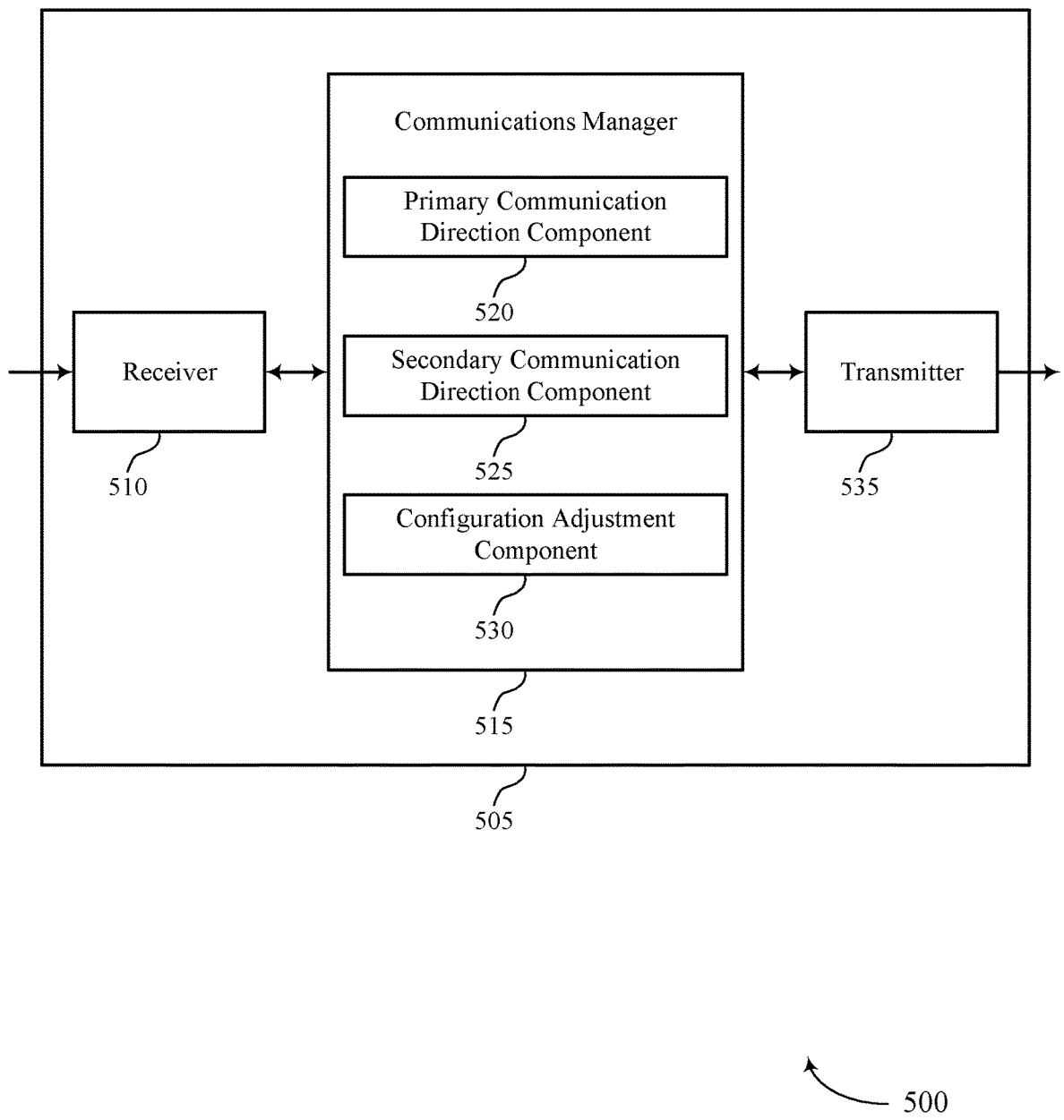

FIG. 5 shows a block diagram 500 of a device 505 that supports indicating slot format indices used across multiple UEs in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to indicating slot format indices used across multiple UEs, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a primary communication direction component 520, a secondary communication direction component 525, and a configuration adjustment component 530. The communications manager 515 may be an example of aspects of the communications manager 710 described herein.

The primary communication direction component 520 may receive a first indication associated with a first wireless device (e.g., the device 505), where the first indication indicates a communication direction for the first wireless device for each of a set of time periods for a time interval.

The secondary communication direction component 525 may receive a second indication associated with a second wireless device, where the second indication indicates a communication direction for the second wireless device for each of the set of time periods for the time interval.

The configuration adjustment component 530 may adjust a communication configuration for at least a subset of the set of time periods based on a communication direction mismatch, where the communication direction mismatch is based on the first indication and the second indication.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

A processor of the device 505 (e.g., controlling receiver 510, the transmitter 535, or the transceiver 720 as described with reference to FIG. 7) may efficiently operate components of the device 505 as described herein to achieve one or more potential advantages. For example, the processor of the device 505 may operate the receiver 510 to receive an indication of an SFI of the device 505 and an indication of an SFI of another wireless device. The processor of the device 505 may determine a communication direction mismatch, and may adjust communication configurations of the device 505 accordingly. For example, the processor of the UE 115 may operate transmitter 535 to transmit a beam switch request for communications by the device 505, which may improve efficiency and reliability at the device 505 by decreasing interference, and thereby improving battery life of the device 505.

Figure 6:
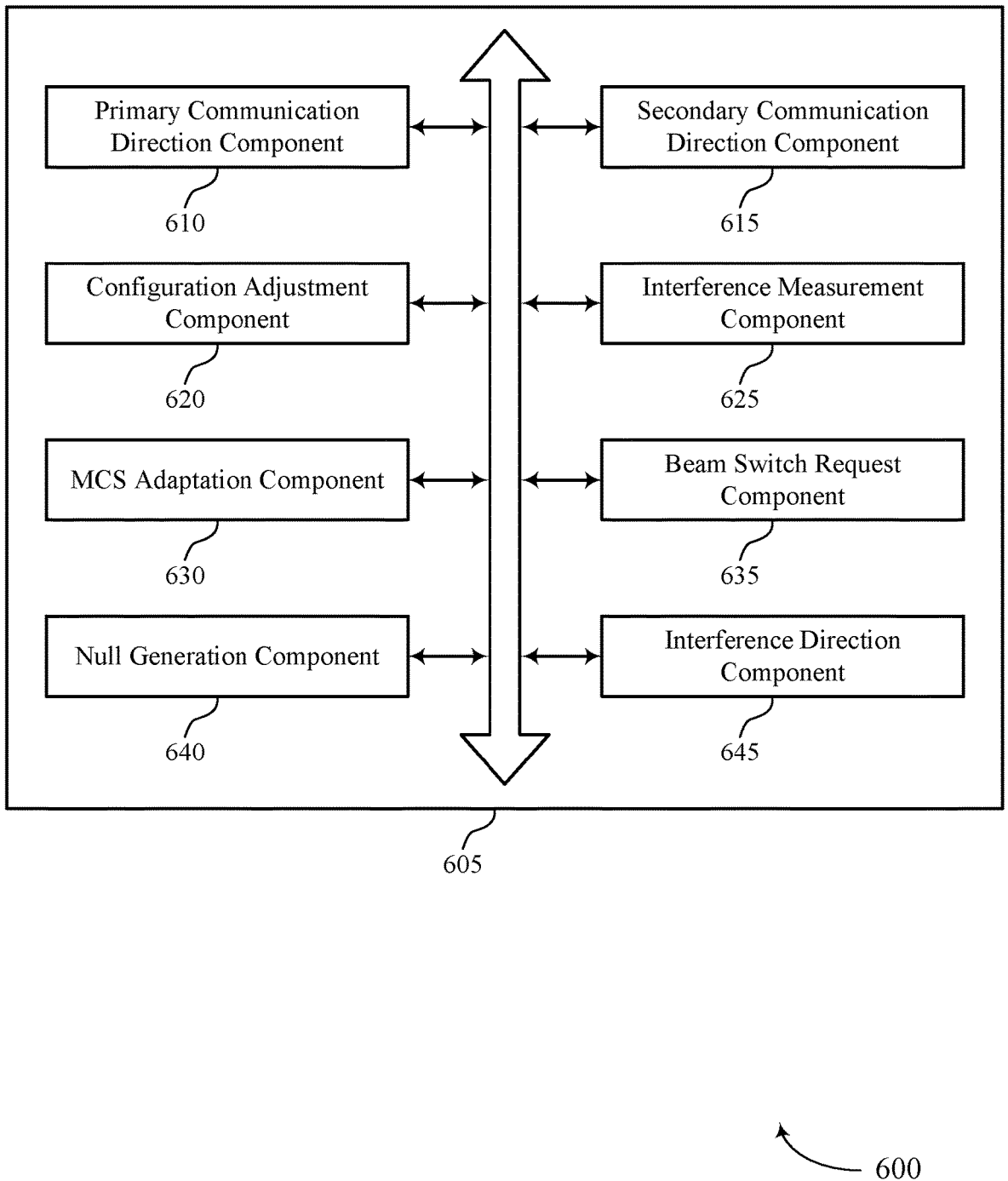
FIG. 6 shows a block diagram of a communications manager that supports indicating slot format indices used across multiple UEs in accordance with aspects of the present disclosure.

FIG. 6 shows a block diagram 600 of a communications manager 605 that supports indicating slot format indices used across multiple UEs in accordance with aspects of the present disclosure. The communications manager 605 may be an example of aspects of a communications manager 415, a communications manager 515, or a communications manager 710 described herein. The communications manager 605 may include a primary communication direction component 610, a secondary communication direction component 615, a configuration adjustment component 620, an interference measurement component 625, a MCS adaptation component 630, a beam switch request component 635, a null generation component 640, and an interference direction component 645. Each of these modules may communicate, directly or indirectly, with one another (e.g., via one or more buses).

The primary communication direction component 610 may receive a first indication associated with a first wireless device, where the first indication indicates a communication direction for the first wireless device for each of a set of time periods for a time interval.

In some cases, the set of time periods includes a set of symbols and the time interval includes a slot.

In some cases, the communication direction for the first wireless device is based on an uplink symbol, a downlink symbol, a flexible symbol, or a gap symbol.

In some cases, the communication direction mismatch includes an uplink direction indicated by the first indication for the set of time periods and a downlink direction indicated by the second indication for the set of time periods.

The secondary communication direction component 615 may receive a second indication associated with a second wireless device, where the second indication indicates a communication direction for the second wireless device for each of the set of time periods for the time interval.

In some cases, the communication direction for the second wireless device is based on an uplink symbol, a downlink symbol, a flexible symbol, or a gap symbol.

The configuration adjustment component 620 may adjust a communication configuration for at least a subset of the set of time periods based on a communication direction mismatch, where the communication direction mismatch is based on the first indication and the second indication.

The interference measurement component 625 may measure interference for at least a set of time periods for one or more previous time intervals.

In some examples, the interference measurement component 625 may perform an interference and noise covariance matrix estimate based on the measured interference.

In some examples, the interference measurement component 625 may adjust a downlink channel reception parameter based on the measured interference and the interference and noise covariance matrix estimate.

The MCS adaptation component 630 may adapt an MCS for at least the subset of the set of time periods.

The beam switch request component 635 may transmit a beam switch request for communications by the first wireless device during at least the subset of the set of time periods.

The null generation component 640 may generate a beam null in an interference direction of the second wireless device.

The interference direction component 645 may receive an indication of the interference direction from a network or the second wireless device, where generating the beam null is based on the received indication of the interference direction.

Figure 7:
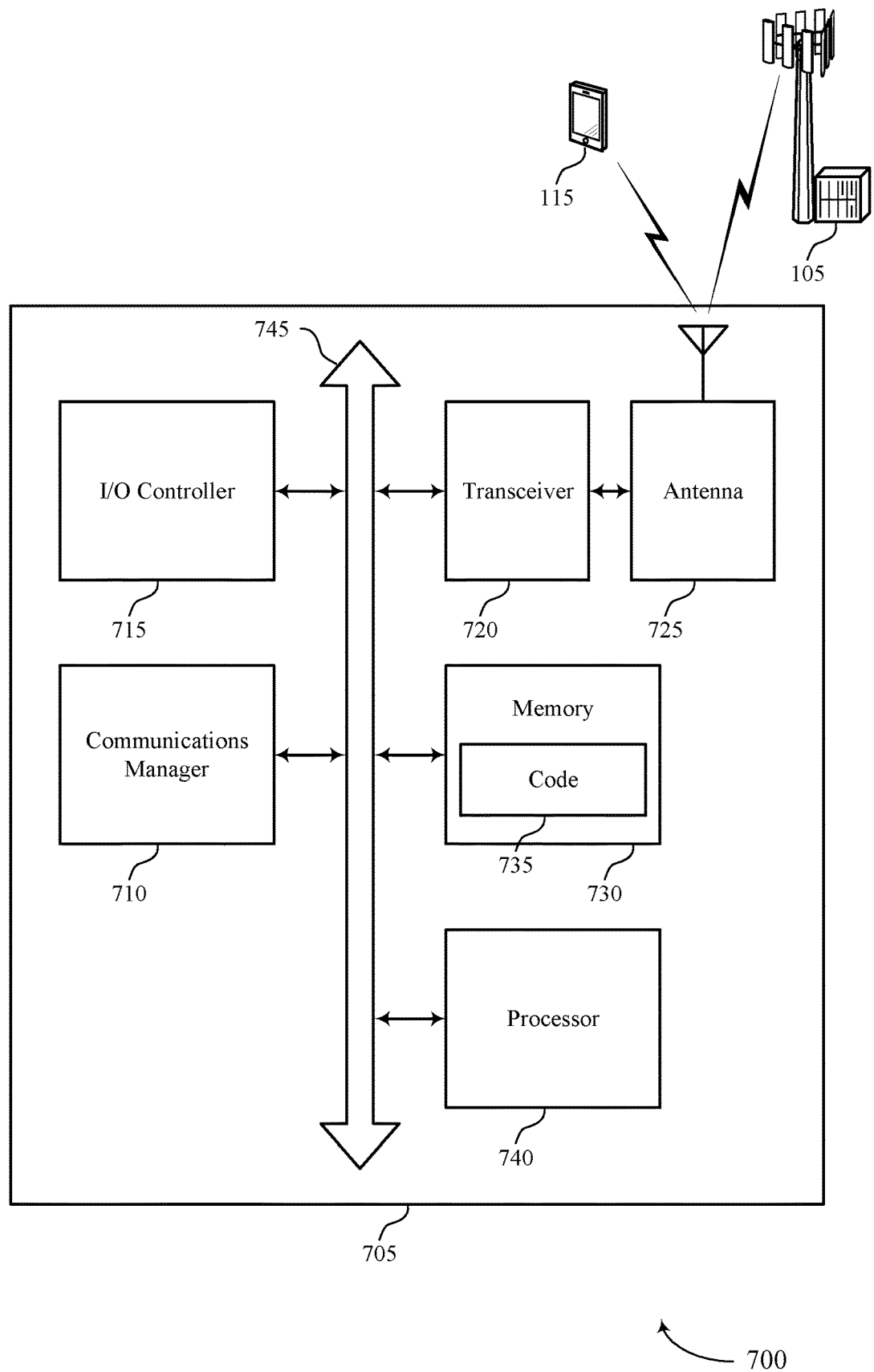
FIG. 7 shows a diagram of a system including a device that supports indicating slot format indices used across multiple UEs in accordance with aspects of the present disclosure.

FIG. 7 shows a diagram of a system 700 including a device 705 that supports indicating slot format indices used across multiple UEs in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive a first indication associated with a first wireless device, where the first indication indicates a communication direction for the first wireless device for each of a set of time periods for a time interval, receive a second indication associated with a second wireless device, where the second indication indicates a communication direction for the second wireless device for each of the set of time periods for the time interval, and adjust a communication configuration for at least a subset of the set of time periods based on a communication direction mismatch, where the communication direction mismatch is based on the first indication and the second indication.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random access memory (RAM) and read only memory (ROM). The memory 730 may store computer-readable, computer-executable code 735 including instructions that, when executed, cause the processor to perform various functions described herein. In some cases, the memory 730 may contain, among other things, a basic (I/O) system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting indicating slot format indices used across multiple UEs).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
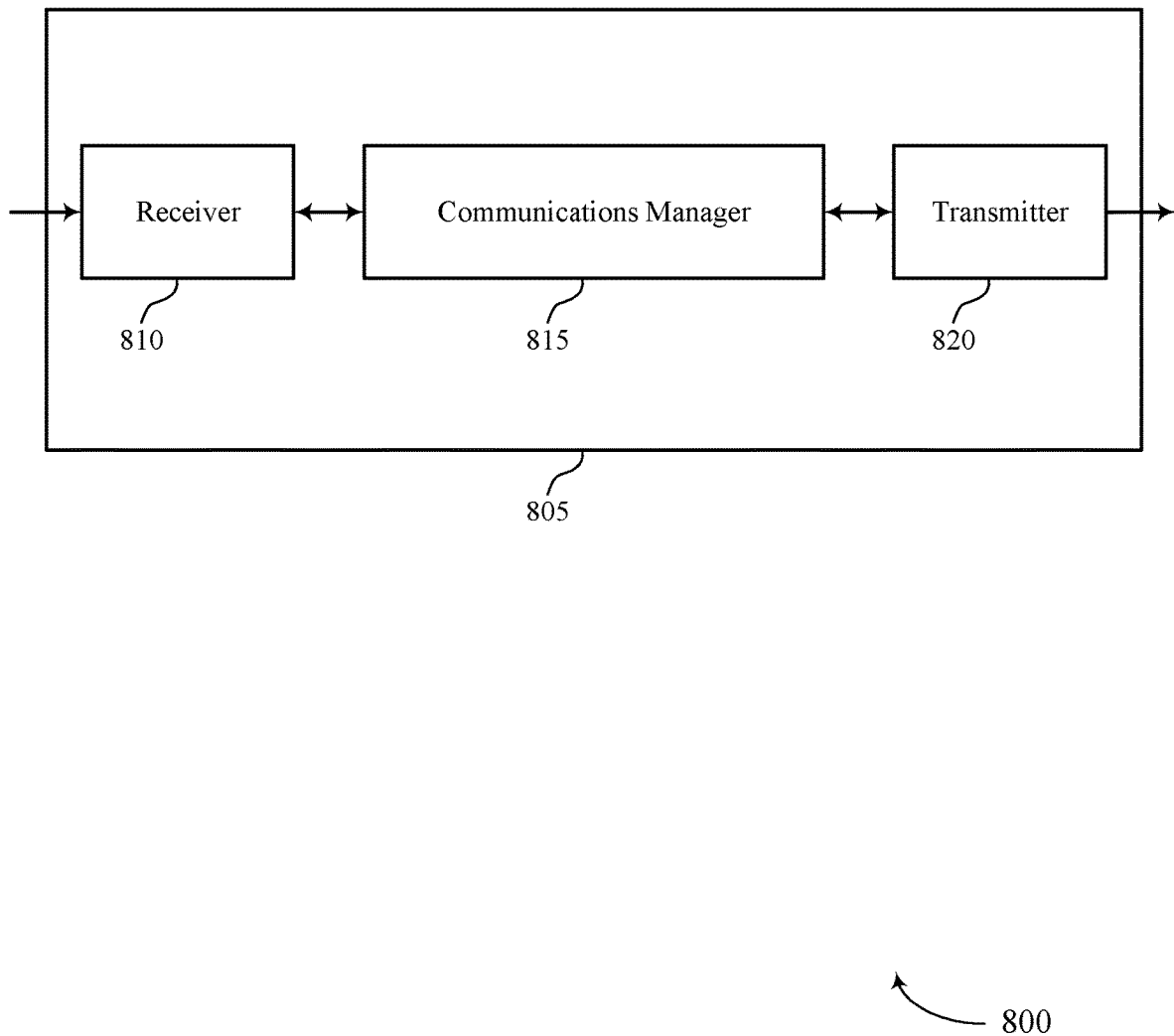
FIGS. 8 and 9 show block diagrams of devices that support indicating slot format indices used across multiple UEs in accordance with aspects of the present disclosure.

FIG. 8 shows a block diagram 800 of a device 805 that supports indicating slot format indices used across multiple UEs in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to indicating slot format indices used across multiple UEs, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit a first indication associated with a first wireless device, where the first indication indicates a communication direction for the first wireless device for each of a set of time periods for a time interval, identify a communication direction mismatch between the first indication and a second indication for a second wireless device for at least a set of time periods of the set of time periods, and transmit the second indication to the first wireless device based on the communication direction mismatch. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
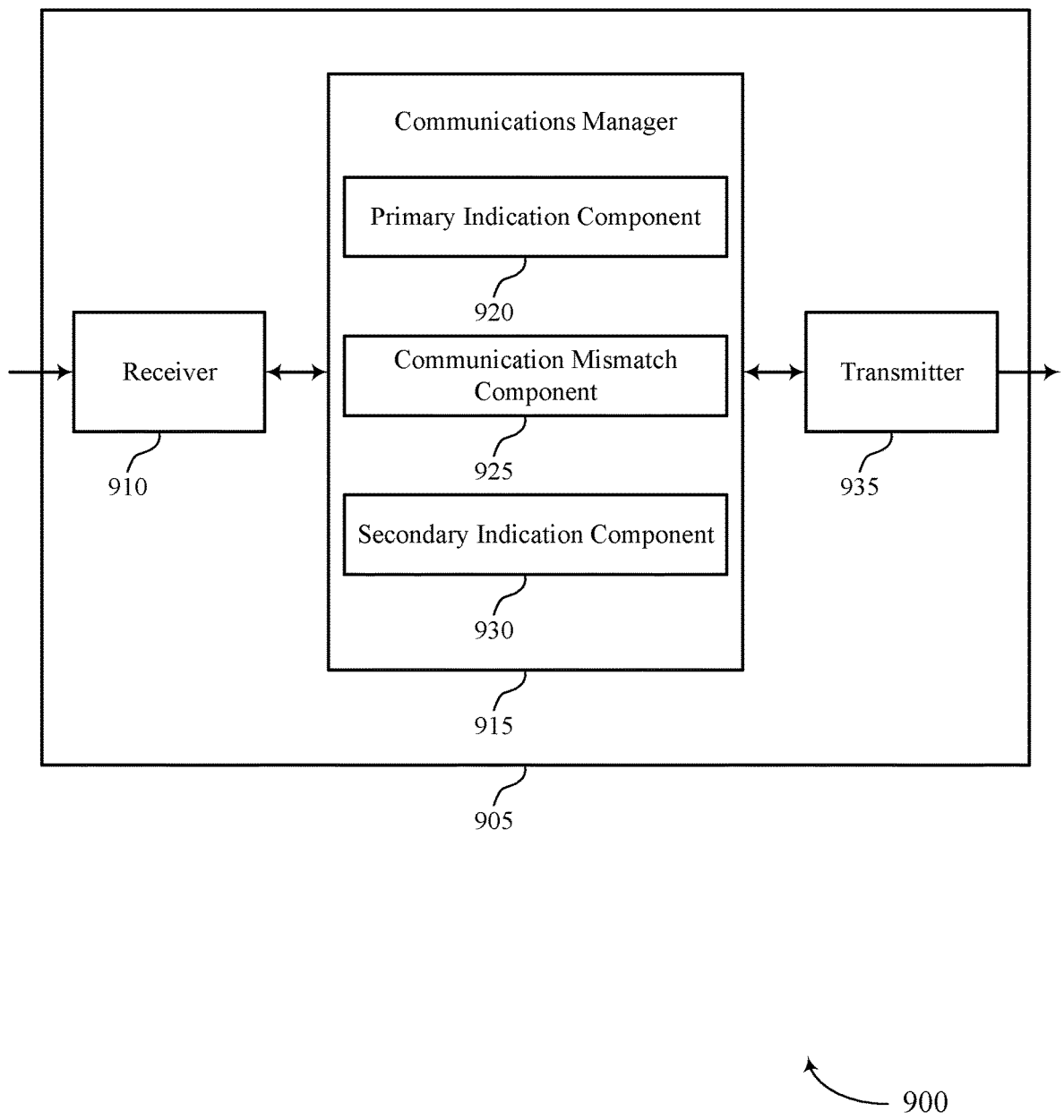

FIG. 9 shows a block diagram 900 of a device 905 that supports indicating slot format indices used across multiple UEs in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to indicating slot format indices used across multiple UEs, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a primary indication component 920, a communication mismatch component 925, and a secondary indication component 930. The communications manager 915 may be an example of aspects of the communications manager 1110 described herein.

The primary indication component 920 may transmit a first indication associated with a first wireless device, where the first indication indicates a communication direction for the first wireless device for each of a set of time periods for a time interval.

The communication mismatch component 925 may identify a communication direction mismatch between the first indication and a second indication for a second wireless device for at least a set of time periods of the set of time periods.

The secondary indication component 930 may transmit the second indication to the first wireless device based on the communication direction mismatch.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
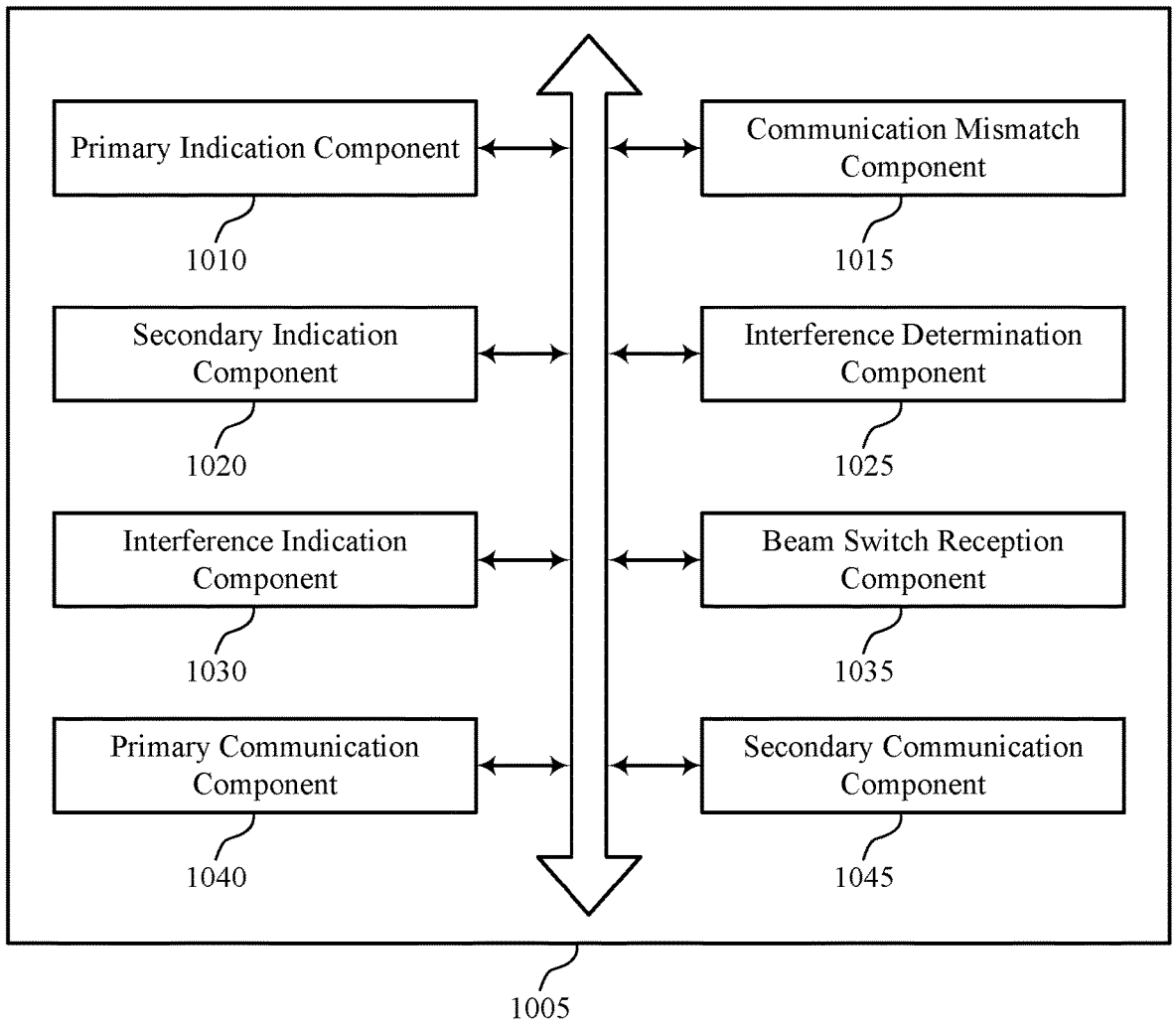
FIG. 10 shows a block diagram of a communications manager that supports indicating slot format indices used across multiple UEs in accordance with aspects of the present disclosure.

FIG. 10 shows a block diagram 1000 of a communications manager 1005 that supports indicating slot format indices used across multiple UEs in accordance with aspects of the present disclosure. The communications manager 1005 may be an example of aspects of a communications manager 815, a communications manager 915, or a communications manager 1110 described herein. The communications manager 1005 may include a primary indication component 1010, a communication mismatch component 1015, a secondary indication component 1020, an interference determination component 1025, an interference indication component 1030, a beam switch reception component 1035, a primary communication component 1040, and a secondary communication component 1045. Each of these modules may communicate, directly or indirectly, with one another (e.g., via one or more buses).

The primary indication component 1010 may transmit a first indication associated with a first wireless device, where the first indication indicates a communication direction for the first wireless device for each of a set of time periods for a time interval.

The communication mismatch component 1015 may identify a communication direction mismatch between the first indication and a second indication for a second wireless device for at least a set of time periods of the set of time periods. In some cases, the communication direction for the first wireless device is based on an uplink symbol, a downlink symbol, a flexible symbol, or a gap symbol. In some cases, the communication direction mismatch includes an uplink direction indicated by the first indication for the set of time periods and a downlink direction indicated by the second indication for the set of time periods.

The secondary indication component 1020 may transmit the second indication to the first wireless device based on the communication direction mismatch.

The interference determination component 1025 may determine an interference direction between the first wireless device and the second wireless device. The interference indication component 1030 may transmit an indication of the determined interference direction to the first wireless device.

The beam switch reception component 1035 may receive a beam switch request from the first wireless device for at least the set of time periods. The primary communication component 1040 may communicate with the first wireless device via a first transmission and reception point.

In some cases, the transmitting the second indication to the first wireless device is based on communicating with the first wireless device via the first transmission and reception point and communicating with the second wireless device via the second transmission and reception point. In some cases, the transmitting the second indication to the first wireless device further includes adjusting an index of the second indication based on the communication direction mismatch.

The secondary communication component 1045 may communicate with the second wireless device via a second transmission and reception point.

Figure 11:
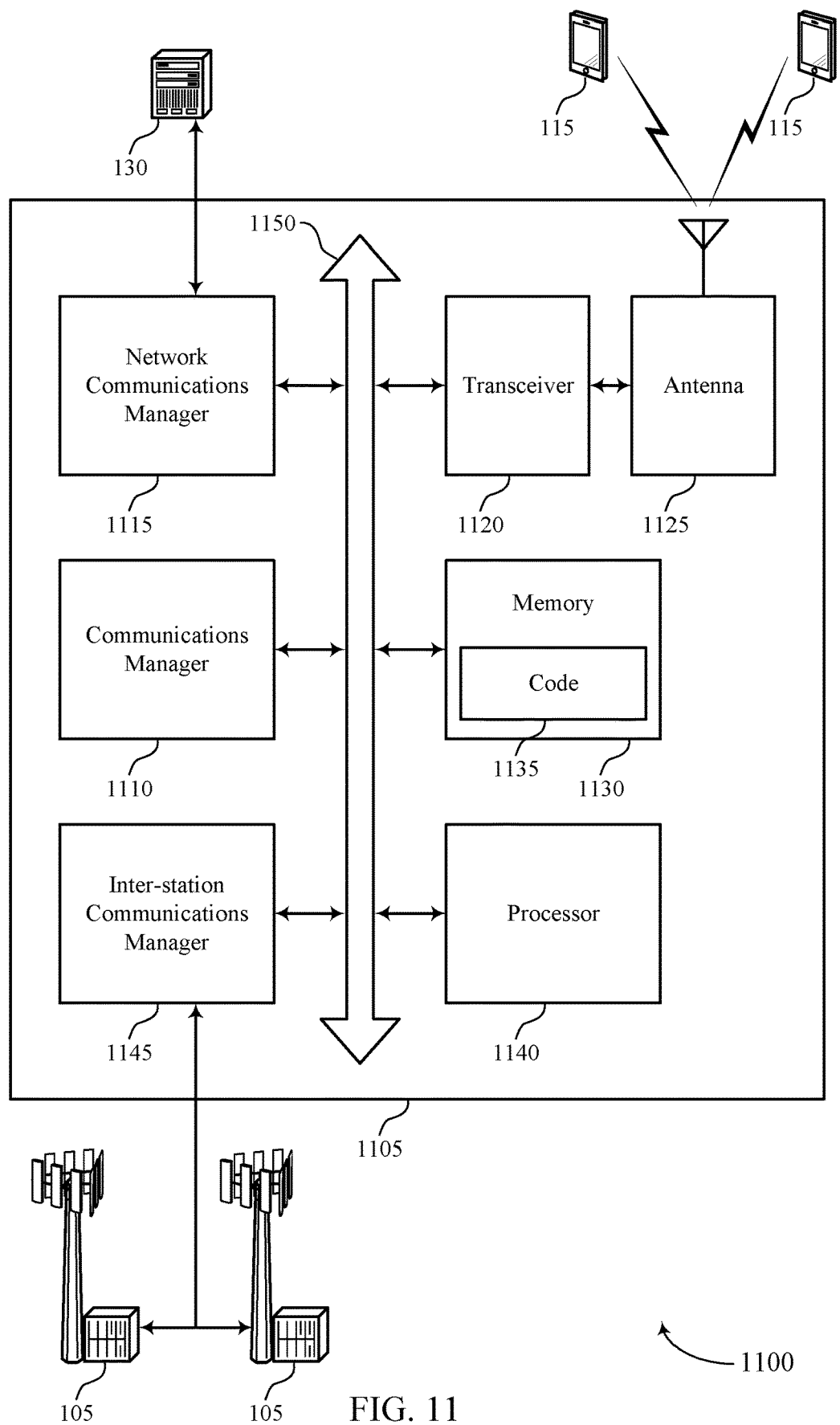
FIG. 11 shows a diagram of a system including a device that supports indicating slot format indices used across multiple UEs in accordance with aspects of the present disclosure.

FIG. 11 shows a diagram of a system 1100 including a device 1105 that supports indicating slot format indices used across multiple UEs in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit a first indication associated with a first wireless device, where the first indication indicates a communication direction for the first wireless device for each of a set of time periods for a time interval, identify a communication direction mismatch between the first indication and a second indication for a second wireless device for at least a set of time periods of the set of time periods, and transmit the second indication to the first wireless device based on the communication direction mismatch.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting indicating slot format indices used across multiple UEs).

The inter-station communications manager 1145 may manage communications with other base station 105 and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
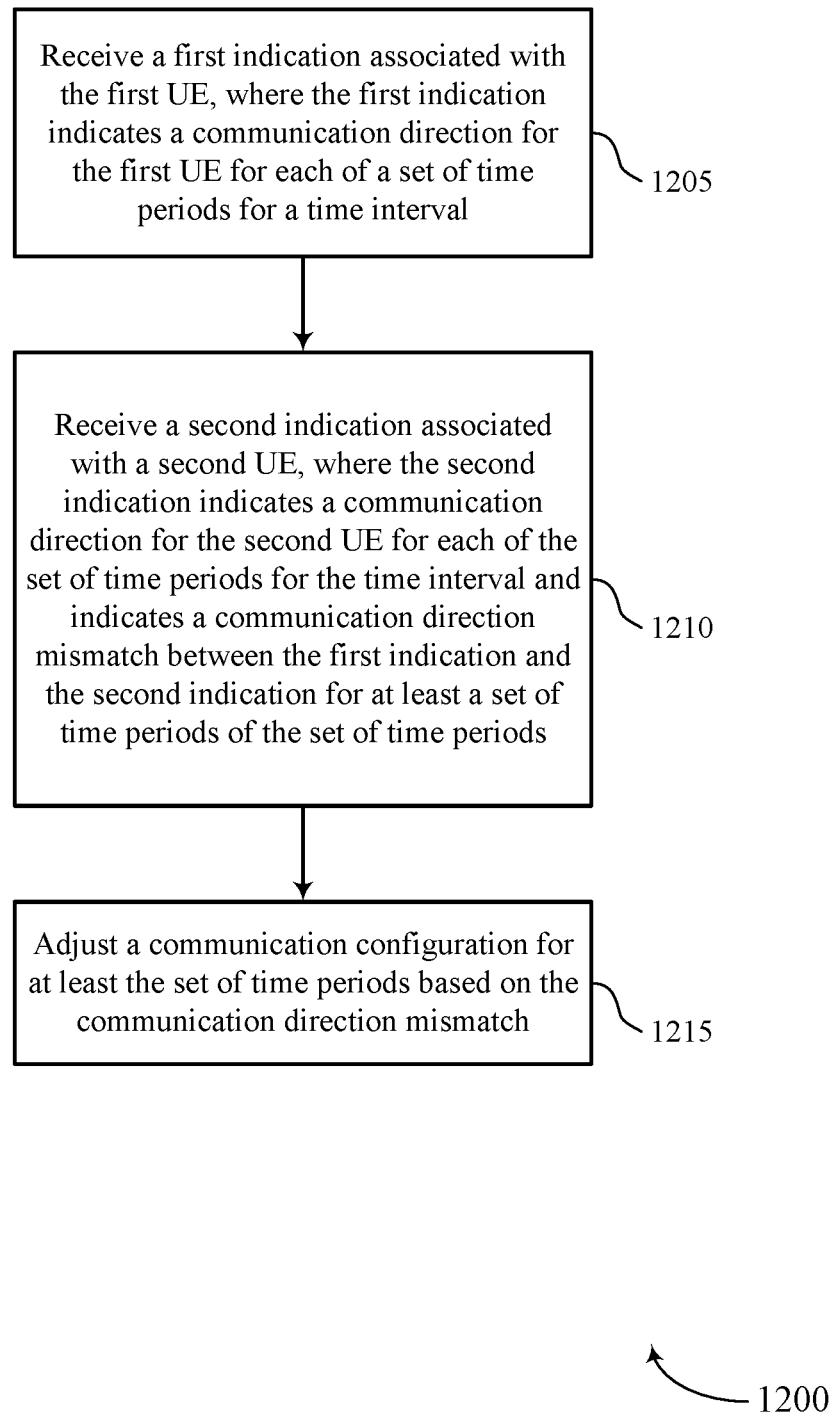
FIGS. 12 through 16 show flowcharts illustrating methods that support indicating slot format indices used across multiple UEs in accordance with aspects of the present disclosure.

FIG. 12 shows a flowchart illustrating a method 1200 that supports indicating slot format indices used across multiple UEs in accordance with aspects of the present disclosure. The operations of method 1200 may be implemented by a first wireless device (e.g., a UE 115) or its components as described herein. For example, the operations of method 1200 may be performed by a communications manager as described with reference to FIGS. 4 through 7. In some examples, a wireless device may execute a set of instructions to control the functional elements of the wireless device to perform the functions described below. Additionally or alternatively, a wireless device may perform aspects of the functions described below using special-purpose hardware.

At 1205, the first wireless device may receive a first indication associated with the first wireless device, where the first indication indicates a communication direction for the first wireless device for each of a set of time periods for a time interval. The operations of 1205 may be performed according to the methods described herein. In some examples, aspects of the operations of 1205 may be performed by a primary communication direction component as described with reference to FIGS. 4 through 7.

At 1210, the first wireless device may receive a second indication associated with a second wireless device, where the second indication indicates a communication direction for the second wireless device for each of the set of time periods for the time interval. The operations of 1210 may be performed according to the methods described herein. In some examples, aspects of the operations of 1210 may be performed by a secondary communication direction component as described with reference to FIGS. 4 through 7.

At 1215, the UE may adjust a communication configuration for at least a subset of the set of time periods based on a communication direction mismatch, where the communication direction mismatch is based on the first indication and the second indication. The operations of 1215 may be performed according to the methods described herein. In some examples, aspects of the operations of 1215 may be performed by a configuration adjustment component as described with reference to FIGS. 4 through 7.

Figure 13:
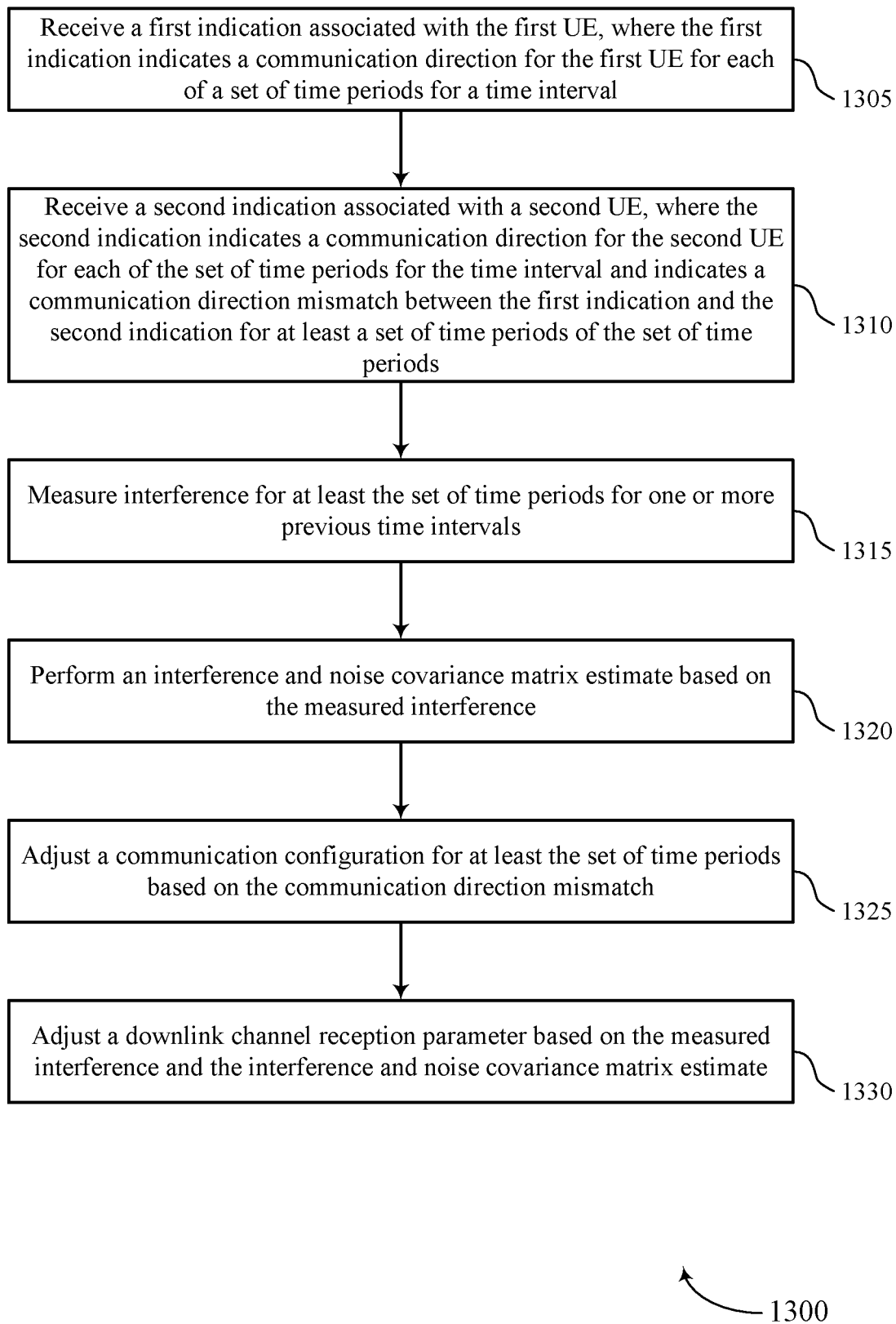

FIG. 13 shows a flowchart illustrating a method 1300 that supports indicating slot format indices used across multiple UEs in accordance with aspects of the present disclosure. The operations of method 1300 may be implemented by a first wireless device (e.g., a UE 115) or its components as described herein. For example, the operations of method 1300 may be performed by a communications manager as described with reference to FIGS. 4 through 7. In some examples, a wireless device may execute a set of instructions to control the functional elements of the wireless device to perform the functions described below. Additionally or alternatively, a wireless device may perform aspects of the functions described below using special-purpose hardware.

At 1305, the first wireless device may receive a first indication associated with the first wireless device, where the first indication indicates a communication direction for the first wireless device for each of a set of time periods for a time interval. The operations of 1305 may be performed according to the methods described herein. In some examples, aspects of the operations of 1305 may be performed by a primary communication direction component as described with reference to FIGS. 4 through 7.

At 1310, the wireless device may receive a second indication associated with a second wireless device, where the second indication indicates a communication direction for the second wireless device for each of the set of time periods for the time interval. The operations of 1310 may be performed according to the methods described herein. In some examples, aspects of the operations of 1310 may be performed by a secondary communication direction component as described with reference to FIGS. 4 through 7.

At 1315, the first wireless device may measure interference for at least a set of time periods for one or more previous time intervals. The operations of 1315 may be performed according to the methods described herein. In some examples, aspects of the operations of 1315 may be performed by an interference measurement component as described with reference to FIGS. 4 through 7.

At 1320, the first wireless device may perform an interference and noise covariance matrix estimate based on the measured interference. The operations of 1320 may be performed according to the methods described herein. In some examples, aspects of the operations of 1320 may be performed by an interference measurement component as described with reference to FIGS. 4 through 7.

At 1325, the first wireless device may adjust a communication configuration for at least the set of time periods based on a communication direction mismatch, where the communication direction mismatch is based on the first indication and the second indication. The operations of 1325 may be performed according to the methods described herein. In some examples, aspects of the operations of 1325 may be performed by a configuration adjustment component as described with reference to FIGS. 4 through 7.

At 1330, the first wireless device may adjust a downlink channel reception parameter based on the measured interference and the interference and noise covariance matrix estimate. The operations of 1330 may be performed according to the methods described herein. In some examples, aspects of the operations of 1330 may be performed by an interference measurement component as described with reference to FIGS. 4 through 7.

Figure 14:
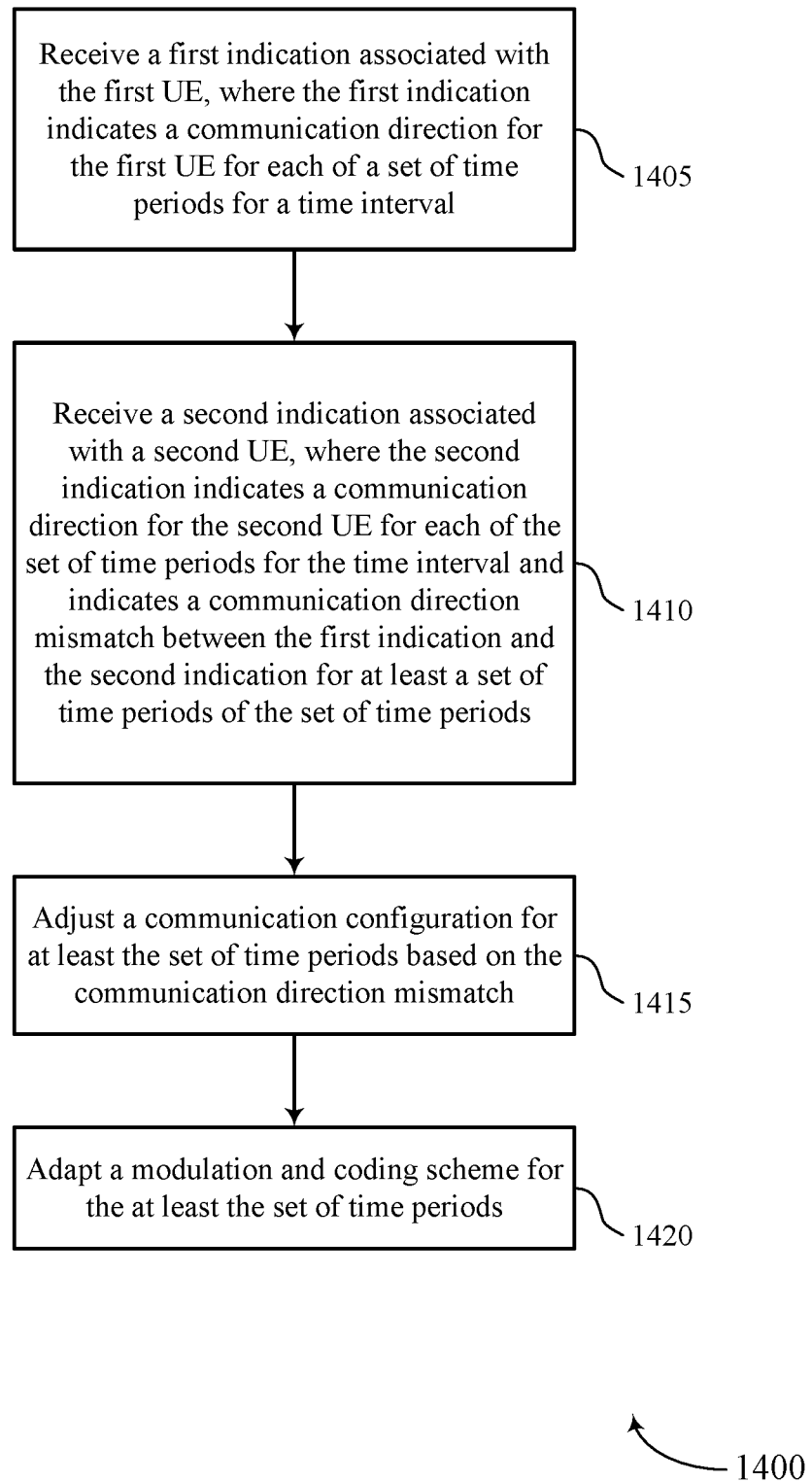

FIG. 14 shows a flowchart illustrating a method 1400 that supports indicating slot format indices used across multiple UEs in accordance with aspects of the present disclosure. The operations of method 1400 may be implemented by a first wireless device (e.g., a UE 115) or its components as described herein. For example, the operations of method 1400 may be performed by a communications manager as described with reference to FIGS. 4 through 7. In some examples, a wireless device (e.g., a UE 115) may execute a set of instructions to control the functional elements of the wireless device to perform the functions described below. Additionally or alternatively, a wireless device may perform aspects of the functions described below using special-purpose hardware.

At 1405, the first wireless device may receive a first indication associated with the first wireless device, where the first indication indicates a communication direction for the first wireless device for each of a set of time periods for a time interval. The operations of 1405 may be performed according to the methods described herein. In some examples, aspects of the operations of 1405 may be performed by a primary communication direction component as described with reference to FIGS. 4 through 7.

At 1410, the first wireless device may receive a second indication associated with a second wireless device, where the second indication indicates a communication direction for the second wireless device for each of the set of time periods for the time interval. The operations of 1410 may be performed according to the methods described herein. In some examples, aspects of the operations of 1410 may be performed by a secondary communication direction component as described with reference to FIGS. 4 through 7.

At 1415, the first wireless device may adjust a communication configuration for at least a subset of the set of time periods based on a communication direction mismatch, where the communication direction mismatch is based on the first indication and the second indication. The operations of 1415 may be performed according to the methods described herein. In some examples, aspects of the operations of 1415 may be performed by a configuration adjustment component as described with reference to FIGS. 4 through 7.

At 1420, the first wireless device may adapt an MCS for at least the subset of the set of time periods. The operations of 1420 may be performed according to the methods described herein. In some examples, aspects of the operations of 1420 may be performed by an MCS adaptation component as described with reference to FIGS. 4 through 7.

Figure 15:
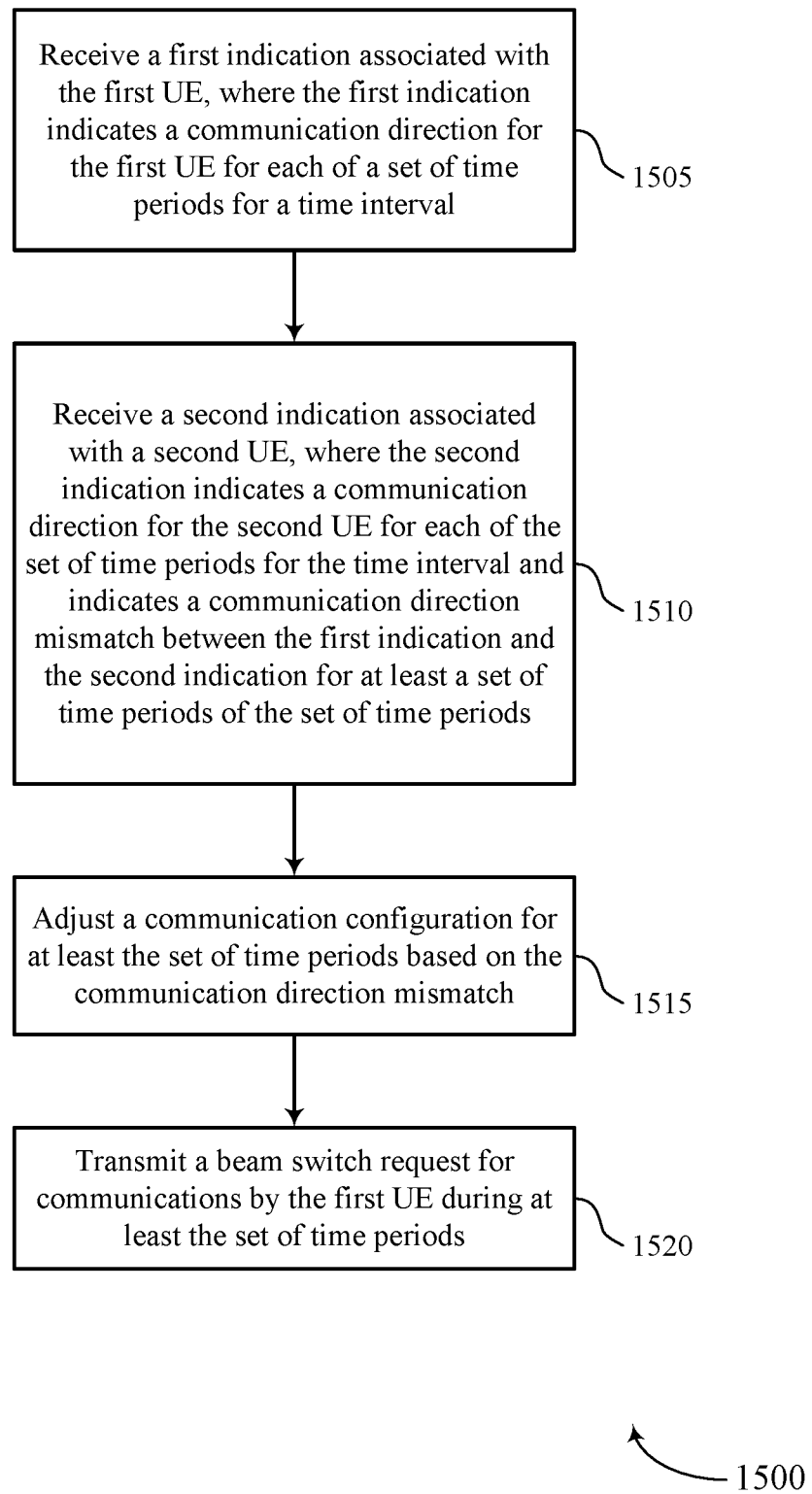

FIG. 15 shows a flowchart illustrating a method 1500 that supports indicating slot format indices used across multiple UEs in accordance with aspects of the present disclosure. The operations of method 1500 may be implemented by a first wireless device (e.g., a UE 115) or its components as described herein. For example, the operations of method 1500 may be performed by a communications manager as described with reference to FIGS. 4 through 7. In some examples, a wireless device may execute a set of instructions to control the functional elements of the wireless device to perform the functions described below. Additionally or alternatively, a wireless device may perform aspects of the functions described below using special-purpose hardware.

At 1505, the first wireless device may receive a first indication associated with the first wireless device, where the first indication indicates a communication direction for the first wireless device for each of a set of time periods for a time interval. The operations of 1505 may be performed according to the methods described herein. In some examples, aspects of the operations of 1505 may be performed by a primary communication direction component as described with reference to FIGS. 4 through 7.

At 1510, the first wireless device may receive a second indication associated with a second wireless device, where the second indication indicates a communication direction for the second wireless device for each of the set of time periods for the time interval. The operations of 1510 may be performed according to the methods described herein. In some examples, aspects of the operations of 1510 may be performed by a secondary communication direction component as described with reference to FIGS. 4 through 7.

At 1515, the UE may adjust a communication configuration for at least a subset of the set of time periods based on a communication direction mismatch, where the communication direction mismatch is based on the first indication and the second indication. The operations of 1515 may be performed according to the methods described herein. In some examples, aspects of the operations of 1515 may be performed by a configuration adjustment component as described with reference to FIGS. 4 through 7.

At 1520, the first wireless device may transmit a beam switch request for communications by the first wireless device during at least the set of time periods. The operations of 1520 may be performed according to the methods described herein. In some examples, aspects of the operations of 1520 may be performed by a beam switch request component as described with reference to FIGS. 4 through 7.

Figure 16:
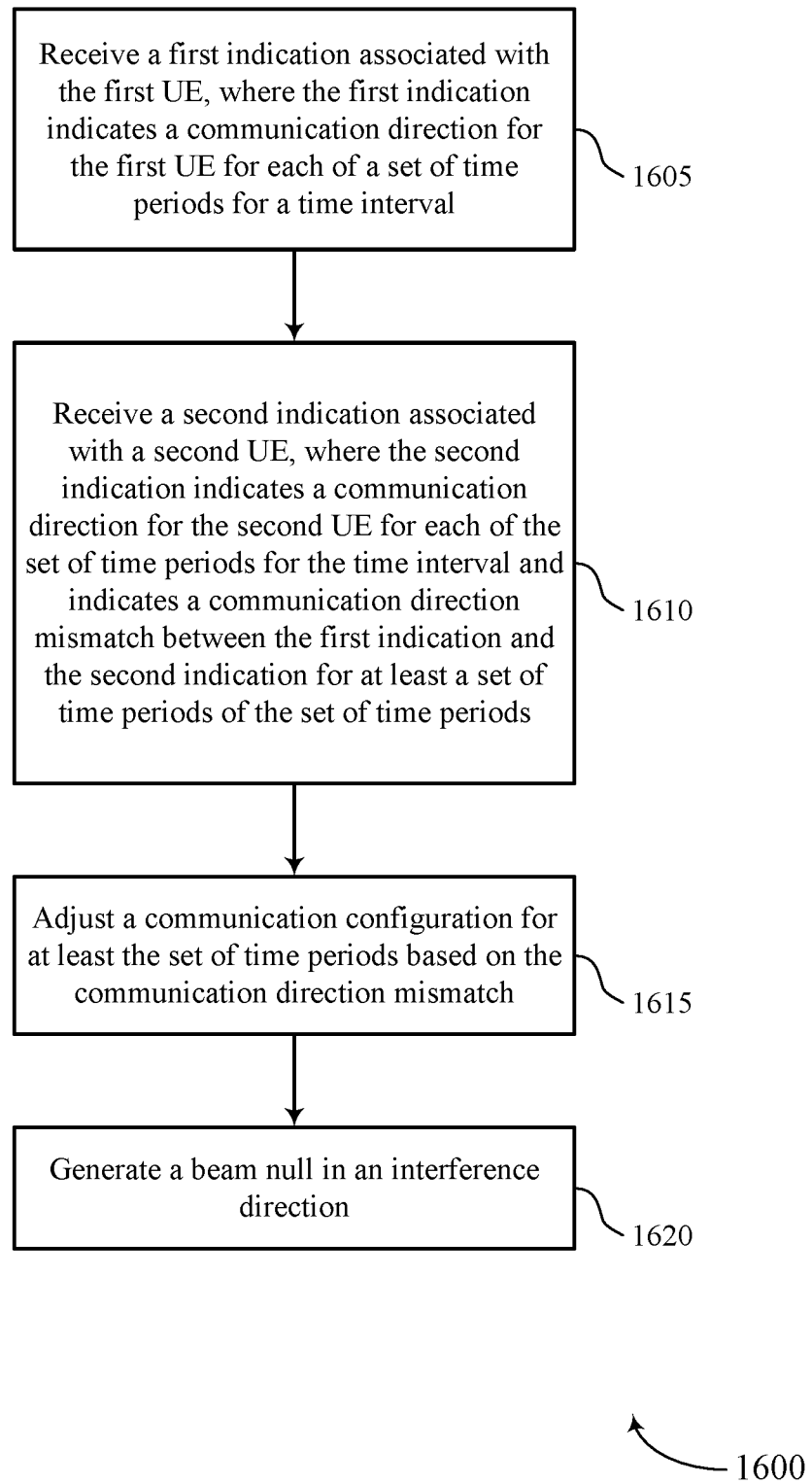

FIG. 16 shows a flowchart illustrating a method 1600 that supports indicating slot format indices used across multiple UEs in accordance with aspects of the present disclosure. The operations of method 1600 may be implemented by a first wireless device (e.g., a UE 115) or its components as described herein. For example, the operations of method 1600 may be performed by a communications manager as described with reference to FIGS. 4 through 7. In some examples, a wireless device may execute a set of instructions to control the functional elements of the wireless device to perform the functions described below. Additionally or alternatively, a wireless device may perform aspects of the functions described below using special-purpose hardware.

At 1605, the first wireless device may receive a first indication associated with the first wireless device, where the first indication indicates a communication direction for the first wireless device for each of a set of time periods for a time interval. The operations of 1605 may be performed according to the methods described herein. In some examples, aspects of the operations of 1605 may be performed by a primary communication direction component as described with reference to FIGS. 4 through 7.

At 1610, the first wireless device may receive a second indication associated with a second wireless device, where the second indication indicates a communication direction for the second wireless device for each of the set of time periods for the time interval. The operations of 1610 may be performed according to the methods described herein. In some examples, aspects of the operations of 1610 may be performed by a secondary communication direction component as described with reference to FIGS. 4 through 7.

At 1615, the first wireless device may adjust a communication configuration for at least a subset of the set of time periods based on a communication direction mismatch, where the communication direction mismatch is based on the first indication and the second indication. The operations of 1615 may be performed according to the methods described herein. In some examples, aspects of the operations of 1615 may be performed by a configuration adjustment component as described with reference to FIGS. 4 through 7.

At 1620, the first wireless device may generate a beam null in an interference direction of the second wireless device. The operations of 1620 may be performed according to the methods described herein. In some examples, aspects of the operations of 1620 may be performed by a null generation component as described with reference to FIGS. 4 through 7.

The following provides an overview of aspects of the present disclosure:

Aspect 1: A method for wireless communications at a first wireless device, comprising: receiving a first indication associated with the first wireless device, wherein the first indication indicates a communication direction for the first wireless device for each of a plurality of time periods for a time interval; receiving a second indication associated with a second wireless device, wherein the second indication indicates a communication direction for the second wireless device for each of the plurality of time periods for the time interval; and adjusting a communication configuration for at least a set of time periods of the plurality of time periods based at least in part on a communication direction mismatch, wherein the communication direction mismatch is based at least in part on the first indication and the second indication.

Aspect 2: The method of aspect 1, wherein adjusting the communication configuration comprises: measuring interference for at least the set of time periods for one or more previous time intervals; performing an interference and noise covariance matrix estimate based at least in part on the measured interference; and adjusting a downlink channel reception parameter based at least in part on the measured interference and the interference and noise covariance matrix estimate.

Aspect 3: The method of any of aspects 1 through 2, wherein adjusting the communication configuration comprises: adapting a modulation and coding scheme for the at least the set of time periods.

Aspect 4: The method of any of aspects 1 through 3, wherein adjusting the communication configuration comprises: transmitting a beam switch request for communications by the first wireless device during at least the set of time periods.

Aspect 5: The method of any of aspects 1 through 4, wherein adjusting the communication configuration comprises: generating a beam null in an interference direction of the second wireless device.

Aspect 6: The method of aspect 5, further comprising: receiving an indication of the interference direction from a network or the second wireless device, wherein generating the beam null is based at least in part on the received indication of the interference direction.

Aspect 7: The method of any of aspects 1 through 6, wherein the plurality of time periods comprises a plurality of symbols, and the time interval comprises a slot.

Aspect 8: The method of any of aspects 1 through 7, wherein the communication direction for the first wireless device is based at least in part on an uplink symbol, a downlink symbol, a flexible symbol, or a gap symbol.

Aspect 9: The method of any of aspects 1 through 8, wherein the communication direction for the second wireless device is based at least in part on an uplink symbol, a downlink symbol, a flexible symbol, or a gap symbol.

Aspect 10: The method of any of aspects 1 through 9, wherein the communication direction mismatch is based at least in part on an uplink direction indicated by the first indication for the set of time periods and a downlink direction indicated by the second indication for the set of time periods.

Aspect 11: A method for wireless communications at a base station, comprising: transmitting a first indication associated with a first wireless device, wherein the first indication indicates a communication direction for the first wireless device for each of a plurality of time periods for a time interval; identifying a communication direction mismatch between the first indication and a second indication for a second wireless device for at least a set of time periods of the plurality of time periods; and transmitting the second indication to the first wireless device based at least in part on the communication direction mismatch.

Aspect 12: The method of aspect 11, further comprising: determining an interference direction between the first wireless device and the second wireless device; and transmitting an indication of the determined interference direction to the first wireless device.

Aspect 13: The method of any of aspects 11 through 12, further comprising: receiving a beam switch request from the first wireless device for at least the set of time periods.

Aspect 14: The method of any of aspects 11 through 13, wherein the communication direction for the first wireless device is based at least in part on an uplink symbol, a downlink symbol, a flexible symbol, or a gap symbol.

Aspect 15: The method of any of aspects 11 through 14, wherein the communication direction mismatch comprises an uplink direction indicated by the first indication for the set of time periods and a downlink direction indicated by the second indication for the set of time periods.

Aspect 16: The method of any of aspects 11 through 15, further comprising: communicating with the first wireless device via a first transmission and reception point; and communicating with the second wireless device via a second transmission and reception point.

Aspect 17: The method of aspect 16, wherein the transmitting the second indication to the first wireless device is based at least in part on communicating with the first wireless device via the first transmission and reception point and communicating with the second wireless device via the second transmission and reception point.

Aspect 18: The method of any of aspects 11 through 17, wherein the transmitting the second indication to the first wireless device further comprises: adjusting an index of the second indication based at least in part on the communication direction mismatch.

Aspect 19: An apparatus for wireless communications at a first wireless device, comprising a processor; memory coupled with the processor; and instructions stored in the memory and executable by the processor to cause the apparatus to perform a method of any of aspects 1 through 10.

Aspect 20: An apparatus for wireless communications at a first wireless device, comprising at least one means for performing a method of any of aspects 1 through 10.

Aspect 21: A non-transitory computer-readable medium storing code for wireless communications at a first wireless device, the code comprising instructions executable by a processor to perform a method of any of aspects 1 through 10.

Aspect 22: An apparatus for wireless communications at a base station, comprising a processor; memory coupled with the processor; and instructions stored in the memory and executable by the processor to cause the apparatus to perform a method of any of aspects 11 through 18.

Aspect 23: An apparatus for wireless communications at a base station, comprising at least one means for performing a method of any of aspects 11 through 18.

Aspect 24: A non-transitory computer-readable medium storing code for wireless communications at a base station, the code comprising instructions executable by a processor to perform a method of any of aspects 11 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microproceSPEssors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:
   receiving first control signaling indicating a communication direction for the first UE for each of a plurality of time periods for a time interval;
   receiving second control signaling indicating a communication direction for a second UE, different from the first UE, for each of the plurality of time periods for the time interval; and
   adjusting a communication configuration for the first UE for at least a set of time periods of the plurality of time periods based at least in part on a communication direction mismatch, wherein the communication direction mismatch is based at least in part on the first control signaling and the second control signaling.

2. The method of claim 1, wherein adjusting the communication configuration comprises:
   measuring interference for a set of time periods for one or more previous time intervals;
   performing an interference and noise covariance matrix estimate based at least in part on the measured interference; and
   adjusting a downlink channel reception parameter based at least in part on the measured interference and the interference and noise covariance matrix estimate.

3. The method of claim 1, wherein adjusting the communication configuration comprises:
   adapting a modulation and coding scheme for at least the set of time periods.

4. The method of claim 1, wherein adjusting the communication configuration comprises:
   transmitting a beam switch request for communications by the first UE during at least the set of time periods.

5. The method of claim 1, wherein adjusting the communication configuration comprises:
   generating a beam null in an interference direction of the second UE.

6. The method of claim 5, further comprising:
   receiving an indication of the interference direction from a network device or the second UE, wherein generating the beam null is based at least in part on the received indication of the interference direction.

7. The method of claim 1, wherein the plurality of time periods comprises a plurality of symbols, and wherein the time interval comprises a slot.

8. The method of claim 1, wherein the communication direction for the first UE is based at least in part on an uplink symbol, a downlink symbol, a flexible symbol, or a gap symbol.

9. The method of claim 1, wherein the communication direction for the second UE is based at least in part on an uplink symbol, a downlink symbol, a flexible symbol, or a gap symbol.

10. The method of claim 1, wherein the communication direction mismatch is based at least in part on an uplink direction indicated by the first control signaling for the set of time periods and a downlink direction indicated by the second control signaling for the set of time periods.

11. An apparatus for wireless communications at a first user equipment (UE), comprising:
    a processor,
    memory coupled with the processor; and
    instructions stored in the memory and executable by the processor to cause the apparatus to:
      receive first control signaling indicating a communication direction for the first UE for each of a plurality of time periods for a time interval;
      receive second control signaling indicating a communication direction for a second UE, different from the first UE, for each of the plurality of time periods for the time interval; and
      adjust a communication configuration for the first UE for at least a set of time periods of the plurality of time periods based at least in part on a communication direction mismatch, wherein the communication direction mismatch is based at least in part on the first control signaling and the second control signaling.

12. The apparatus of claim 11, wherein the instructions to adjust the communication configuration are executable by the processor to cause the apparatus to:
  measure interference for a set of time periods for one or more previous time intervals;
  perform an interference and noise covariance matrix estimate based at least in part on the measured interference; and
  adjust a downlink channel reception parameter based at least in part on the measured interference and the interference and noise covariance matrix estimate.

13. The apparatus of claim 11, wherein the instructions to adjust the communication configuration are executable by the processor to cause the apparatus to:
  adapt a modulation and coding scheme for at least the set of time periods.

14. The apparatus of claim 11, wherein the instructions to adjust the communication configuration are executable by the processor to cause the apparatus to:
  transmit a beam switch request for communications by the first UE during at least the set of time periods.

15. The apparatus of claim 11, wherein the instructions to adjust the communication configuration are executable by the processor to cause the apparatus to:
  generate a beam null in an interference direction of the second UE.

16. The apparatus of claim 15, wherein the instructions are further executable by the processor to cause the apparatus to:
  receive an indication of the interference direction from a network device or the second UE, wherein generating the beam null is based at least in part on the received indication of the interference direction.

17. The apparatus of claim 11, wherein the plurality of time periods comprises a plurality of symbols, and wherein the time interval comprises a slot.

18. The apparatus of claim 11, wherein the communication direction for the first UE is based at least in part on an uplink symbol, a downlink symbol, a flexible symbol, or a gap symbol.

19. The apparatus of claim 11, wherein the communication direction for the second UE is based at least in part on an uplink symbol, a downlink symbol, a flexible symbol, or a gap symbol.

20. The apparatus of claim 11, wherein the communication direction mismatch is based at least in part on an uplink direction indicated by the first control signaling for the set of time periods and a downlink direction indicated by the second control signaling for the set of time periods.

* * * * *